US008094253B2

(12) United States Patent
Handa et al.

(10) Patent No.: US 8,094,253 B2
(45) Date of Patent: Jan. 10, 2012

(54) DISPLAY DEVICE, DRIVING METHOD OF DISPLAY DEVICE, AND DRIVING METHOD OF DISPLAY ELEMENT

(75) Inventors: Tomoaki Handa, Tokyo (JP); Naobumi Toyomura, Kanagawa (JP); Hideki Sugimoto, Kanagawa (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/929,128

(22) Filed: Jan. 3, 2011

(65) Prior Publication Data

US 2011/0205252 A1 Aug. 25, 2011

(30) Foreign Application Priority Data

Feb. 22, 2010 (JP) ................................ 2010-035915

(51) Int. Cl.
*G02F 1/136* (2006.01)

(52) U.S. Cl. ................ 349/43; 349/19; 349/33; 349/41; 349/42; 349/49

(58) Field of Classification Search .................... 349/19, 349/33, 41, 42, 43, 49, 50
See application file for complete search history.

(56) References Cited

U.S. PATENT DOCUMENTS 7,408,533 B2 * 8/2008 Eom et al. ...................... 345/76
2009/0001378 A1 * 1/2009 Miyake .......................... 257/71

FOREIGN PATENT DOCUMENTS

JP 2007-310311 A 11/2007

* cited by examiner

*Primary Examiner* — Jennifer Doan
(74) *Attorney, Agent, or Firm* — Rader, Fishman & Grauer PLLC

(57) ABSTRACT

Disclosed herein is a driving method of a display device. The display device includes display elements arranged in a form of a two-dimensional matrix and each have a driving circuit and a light emitting section. The driving circuit includes a driving transistor having a gate electrode and source/drain regions and a capacitance section, and a current flowing through the light emitting section via the source/drain regions of the driving transistor. The driving method includes the step of performing a first writing process, a second writing process, and then setting the gate electrode of the driving transistor in a floating state. A current corresponding to a value of a voltage retained in the capacitance section for retaining a voltage of the gate electrode of the driving transistor with respect to a source region of the driving transistor flows through the light emitting section, so that the light emitting section emits light.

11 Claims, 15 Drawing Sheets

[TP(2)-1]

[TP(2)0]

[TP(2)1]

[TP(2)2]

[TP(2)3]

[TP(2)3] (CONTINUED)

[TP(2)4]

[TP(2)5]

[TP(2)5] (CONTINUED)

[TP(2)6]

[TP(2)7]

[TP(2)7] (CONTINUED)

[TP(2)$_7$] (CONTINUED)

[TP(2)$_8$]

[TP(2)$_8$] (CONTINUED)

FIG. 11

| DATA NAME | POTENTIAL OF SECOND NODE $ND_2$ AT TIME OF SECOND WRITING PROCESS | VALUE OF $\Delta V_1$ | KIND OF FIRST VIDEO SIGNAL $V_{Sig1\_m}$ | LENGTH OF PERIOD OF APPLICATION OF FIRST VIDEO SIGNAL |
|---|---|---|---|---|
| D(1,1) | vD(1,1) | ΔvD(1,1) (※MINIMUM VALUE) | $V_{Sig1[1]}$ | T(1)=tW |
| D(1,2) | vD(1,2) | ΔvD(1,2) | | T(2) |
| ··· | ··· | ··· | | ··· |
| D(1,q) | vD(1,q) | ΔvD(1,q) | | T(q) |
| ··· | ··· | ··· | | ··· |
| D(1,Q-1) | vD(1,Q-1) | ΔvD(1,Q-1) | | T(Q-1) |
| D(1,Q) | vD(1,Q) | ΔvD(1,Q) | | T(Q)=tB |
| ··· | ··· | ··· | ··· | ··· |
| D(p,1) | vD(p,1) | ΔvD(p,1) | $V_{Sig1[p]}$ | T(1)=tW |
| D(p,2) | vD(p,2) | ΔvD(p,2) | | T(2) |
| ··· | ··· | ··· | | ··· |
| D(p,q) | vD(p,q) | ΔvD(p,q) | | T(q) |
| ··· | ··· | ··· | | ··· |
| D(p,Q-1) | vD(p,Q-1) | ΔvD(p,Q-1) | | T(Q-1) |
| D(p,Q) | vD(p,Q) | ΔvD(p,Q) | | T(Q)=tB |
| ··· | ··· | ··· | ··· | ··· |
| D(P,1) | vD(P,1) | ΔvD(P,1) | $V_{Sig1[P]}$ | T(1)=tW |
| D(P,2) | vD(P,2) | ΔvD(P,2) | | T(2) |
| ··· | ··· | ··· | | ··· |
| D(P,q) | vD(P,q) | ΔvD(P,q) | | T(q) |
| ··· | ··· | ··· | | ··· |
| D(P,Q-1) | vD(P,Q-1) | ΔvD(P,Q-1) | | T(Q-1) |
| D(P,Q) | vD(P,Q) | ΔvD(P,Q) (※MAXIMUM VALUE) | | T(Q)=tB |

FIG. 12

| KIND OF $V_{Sig1\_m}$ | LENGTH OF PERIOD OF APPLICATION OF $V_{Sig1\_m}$ | KIND OF $V_{Sig2\_m}$ | DRAIN CURRENT VALUE | INDEX OF LUMINANCE LEVEL |
|---|---|---|---|---|
| | | $V_{Sig2[1]}$ | Ids(1,1,1) | w(1,1,1) |
| | | ... | ... | ... |
| | T(1) | $V_{Sig2[p']}$ | Ids(1,1,p') | w(1,1,p') |
| | | ... | ... | ... |
| | | $V_{Sig2[P]}$ | Ids(1,1,P)(※MAXIMUM VALUE) | w(1,1,P)=$2^{u}$-1 |
| | ... | ... | ... | ... |
| | | $V_{Sig2[1]}$ | Ids(1,q,1) | w(1,q,1) |
| | | ... | ... | ... |
| $V_{Sig1[1]}$ | T(q) | $V_{Sig2[p']}$ | Ids(1,q,p') | w(1,q,p') |
| | | ... | ... | ... |
| | | $V_{Sig2[P]}$ | Ids(1,q,P) | w(1,q,P) |
| | ... | ... | ... | ... |
| | | $V_{Sig2[1]}$ | Ids(1,Q,1) | w(1,Q,1) |
| | | ... | ... | ... |
| | T(Q) | $V_{Sig2[p']}$ | Ids(1,Q,p') | w(1,Q,p') |
| | | ... | ... | ... |
| | | $V_{Sig2[P]}$ | Ids(1,Q,P) | w(1,Q,P) |
| ... | ... | ... | ... | ... |
| | | $V_{Sig2[1]}$ | Ids(p,1,1) | w(p,1,1) |
| | | ... | ... | ... |
| | T(1) | $V_{Sig2[p']}$ | Ids(p,1,p') | w(p,1,p') |
| | | ... | ... | ... |
| | | $V_{Sig2[P]}$ | Ids(p,1,P) | w(p,1,P) |
| | ... | ... | ... | ... |
| | | $V_{Sig2[1]}$ | Ids(p,q,1) | w(p,q,1) |
| | | ... | ... | ... |
| $V_{Sig1[p]}$ | T(q) | $V_{Sig2[p']}$ | Ids(p,q,p') | w(p,q,p') |
| | | ... | ... | ... |
| | | $V_{Sig2[P]}$ | Ids(p,q,P) | w(p,q,P) |
| | ... | ... | ... | ... |
| | | $V_{Sig2[1]}$ | Ids(p,Q,1) | w(p,Q,1) |
| | | ... | ... | ... |
| | T(Q) | $V_{Sig2[p']}$ | Ids(p,Q,p') | w(p,Q,p') |
| | | ... | ... | ... |
| | | $V_{Sig2[P]}$ | Ids(p,Q,P) | w(p,Q,P) |
| ... | ... | ... | ... | ... |
| | | $V_{Sig2[1]}$ | Ids(P,1,1) | w(P,1,1) |
| | | ... | ... | ... |
| | T(1) | $V_{Sig2[p']}$ | Ids(P,1,p') | w(P,1,p') |
| | | ... | ... | ... |
| | | $V_{Sig2[P]}$ | Ids(P,1,P) | w(P,1,P) |
| | ... | ... | ... | ... |
| | | $V_{Sig2[1]}$ | Ids(P,q,1) | w(P,q,1) |
| | | ... | ... | ... |
| $V_{Sig1[P]}$ | T(q) | $V_{Sig2[p']}$ | Ids(P,q,p') | w(P,q,p') |
| | | ... | ... | ... |
| | | $V_{Sig2[P]}$ | Ids(P,q,P) | w(P,q,P) |
| | ... | ... | ... | ... |
| | | $V_{Sig2[1]}$ | Ids(P,Q,1)(※MINIMUM VALUE) | w(P,Q,1)=0 |
| | | ... | ... | ... |
| | T(Q) | $V_{Sig2[p']}$ | Ids(P,Q,p') | w(P,Q,p') |
| | | ... | ... | ... |
| | | $V_{Sig2[P]}$ | Ids(P,Q,P) | w(P,Q,P) |

DISPLAY DEVICE, DRIVING METHOD OF DISPLAY DEVICE, AND DRIVING METHOD OF DISPLAY ELEMENT

BACKGROUND OF THE INVENTION

1. Field of the Invention

The present invention relates to a display device, a driving method of the display device, and a driving method of a display element, and particularly to a display device including a display element having a driving circuit and a current driven type light emitting section, a driving method of the display device, and a driving method of a display element having a driving circuit and a current driven type light emitting section.

2. Description of the Related Art

A display element including a current driven type light emitting section and a display device including such a display element are well known. For example, a display element including an organic electroluminescence light emitting section using the electroluminescence of an organic material is drawing attention as a display element capable of high-luminance light emission effected by low-voltage direct-current driving.

As in a liquid crystal display device, a simple matrix system and an active matrix system are well known as a driving system in a display device including a display element having a current driven type light emitting section. The active matrix system has a disadvantage of making a structure complex, but has an advantage of being able to increase the luminance of an image, for example. A display element having a current driven type light emitting section driven by the active matrix system includes a driving circuit for driving the light emitting section in addition to the light emitting section.

A pixel circuit (display element) 101 including a light emitting element (light emitting section) 3D, a transistor for sampling (writing transistor) 3A, a transistor for driving (driving transistor) 3B, and a storage capacitor (capacitance section) 3C is disclosed in FIG. 3B of Japanese Patent Laid-Open No. 2007-310311 (Patent Document 1), and a display device including the pixel circuit 101 is disclosed in FIG. 3A of Patent Document 1. The display device has a scanning line WSL disposed in each row composed of pixel circuits 101 and a signal line (data line) DTL disposed in each column composed of pixel circuits 101. The scanning line WSL is supplied with a control signal (scanning signal) from a main scanner (scanning circuit) 104. The signal line DTL is supplied with a video signal and various reference voltages from a signal selector (signal output circuit) 103.

SUMMARY OF THE INVENTION

In a related-art display device as shown in Patent Document 1, control of luminance of a display element (gradation control) is performed by controlling the value of a video signal supplied to a data line. For example, when control is performed with gradations set as 0 to 255, or when 8-bit control is performed with the number of gradations set at 256, a video signal whose value changes in $2^8$ steps needs to be supplied to the data line. The number of gradations is thus limited by the number of steps of the video signal.

It is accordingly desirable to provide a display device, a driving method of the display device, and a driving method of a display element that can perform gradation control with a number of gradations which number exceeds the number of steps of a video signal.

According to an embodiment of the present invention, there is provided a driving method of a display device, the display device including display elements arranged in a form of a two-dimensional matrix in a first direction and a second direction, the display elements each having a driving circuit and a current driven type light emitting section, the driving circuit including at least a driving transistor having a gate electrode and source/drain regions and a capacitance section, and a current flowing through the light emitting section via the source/drain regions of the driving transistor, the driving method including the step of, in a state of a predetermined driving voltage being applied to one source/drain region of the driving transistor, performing a first writing process of applying a first video signal to the gate electrode of the driving transistor, next performing a second writing process of applying a second video signal to the gate electrode of the driving transistor, and then setting the gate electrode of the driving transistor in a floating state, whereby a current corresponding to a value of a voltage retained in the capacitance section for retaining a voltage of the gate electrode of the driving transistor with respect to a source region of the driving transistor flows through the light emitting section via the driving transistor, so that the light emitting section emits light, wherein length of a period during which the first video signal is applied to the gate electrode of the driving transistor is adjusted in the first writing process, whereby luminance of light emitted by the light emitting section is controlled on a basis of a value of the first video signal, a value of the length of the period during which the first video signal is applied to the gate electrode of the driving transistor, and a value of the second video signal.

According to an embodiment of the present invention, there is provided a display device including: a signal output circuit, a scanning circuit, and a power supply section; and display elements arranged in a form of a two-dimensional matrix in a first direction and a second direction and each having a driving circuit and a current driven type light emitting section; the driving circuit including at least a driving transistor having a gate electrode and source/drain regions and a capacitance section, and a current flowing through the light emitting section via the source/drain regions of the driving transistor; wherein in a state of a predetermined driving voltage being applied to one source/drain region of the driving transistor on a basis of operation of the power supply section, a first writing process is performed by applying a first video signal to the gate electrode of the driving transistor on a basis of operation of the signal output circuit, next a second writing process is performed by applying a second video signal to the gate electrode of the driving transistor on a basis of operation of the signal output circuit, and then the gate electrode of the driving transistor is set in a floating state on a basis of operation of the scanning circuit, whereby a current corresponding to a value of a voltage retained in the capacitance section for retaining a voltage of the gate electrode of the driving transistor with respect to a source region of the driving transistor flows through the light emitting section via the driving transistor, so that the light emitting section emits light, and length of a period during which the first video signal is applied to the gate electrode of the driving transistor is adjusted in the first writing process, and luminance of light emitted by the light emitting section is controlled on a basis of a value of the first video signal, a value of the length of the period during which the first video signal is applied to the gate electrode of the driving transistor, and a value of the second video signal.

According to an embodiment of the present invention, there is provided a driving method of a display element, the display element having a driving circuit and a current driven type light emitting section, the driving circuit including at least a driving transistor having a gate electrode and source/drain regions and a capacitance section, and a current flowing through the light emitting section via the source/drain regions of the driving transistor, the driving method including the step of, in a state of a predetermined driving voltage being applied to one source/drain region of the driving transistor, performing a first writing process of applying a first video signal to the gate electrode of the driving transistor, next performing a second writing process of applying a second video signal to the gate electrode of the driving transistor, and then setting the gate electrode of the driving transistor in a floating state, whereby a current corresponding to a value of a voltage retained in the capacitance section for retaining a voltage of the gate electrode of the driving transistor with respect to a source region of the driving transistor flows through the light emitting section via the driving transistor, so that the light emitting section emits light, wherein length of a period during which the first video signal is applied to the gate electrode of the driving transistor is adjusted in the first writing process, whereby luminance of light emitted by the light emitting section is controlled on a basis of a value of the first video signal, a value of the length of the period during which the first video signal is applied to the gate electrode of the driving transistor, and a value of the second video signal.

According to further embodiment of the present invention, there is provided a driving method of a display device, the driving method including the step of performing a first writing process of applying a first video signal to a gate electrode of a driving transistor, next performing a second writing process of applying a second video signal to the gate electrode of the driving transistor, and then passing a current through a light emitting section via the driving transistor, so that the light emitting section emits light; wherein a value of the first video signal, a value of length of a period during which the first video signal is applied to the gate electrode of the driving transistor, and a value of the second video signal are controlled.

In the driving method of the display device or the driving method of the display element according to an embodiment of the present invention, length of a period during which the first video signal is applied to the gate electrode of the driving transistor is adjusted in the first writing process, whereby luminance of light emitted by the light emitting section is controlled on a basis of a value of the first video signal, a value of the length of the period during which the first video signal is applied to the gate electrode of the driving transistor, and a value of the second video signal. That is, the luminance is controlled by not only the value of the second video signal but also the value of the first video signal and the value of the length of the period during which the first video signal is applied to the gate electrode of the driving transistor. It is thereby possible to perform gradation control with a number of gradations which number exceeds the number of steps of a video signal (or more specifically the number of steps of the second video signal). In addition, the display device according to an embodiment of the present invention can display images of excellent image quality because the display device performs gradation control with a number of gradations which number exceeds the number of steps of the second video signal.

BRIEF DESCRIPTION OF THE DRAWINGS

FIG. 11 is a table of assistance in explaining relation between a potential correction value, kinds of first video signal, and lengths of the period during which the first writing process is performed;

FIG. 12 is a table of assistance in explaining data stored in a storage device.

DETAILED DESCRIPTION OF THE PREFERRED EMBODIMENTS

Figure 1:
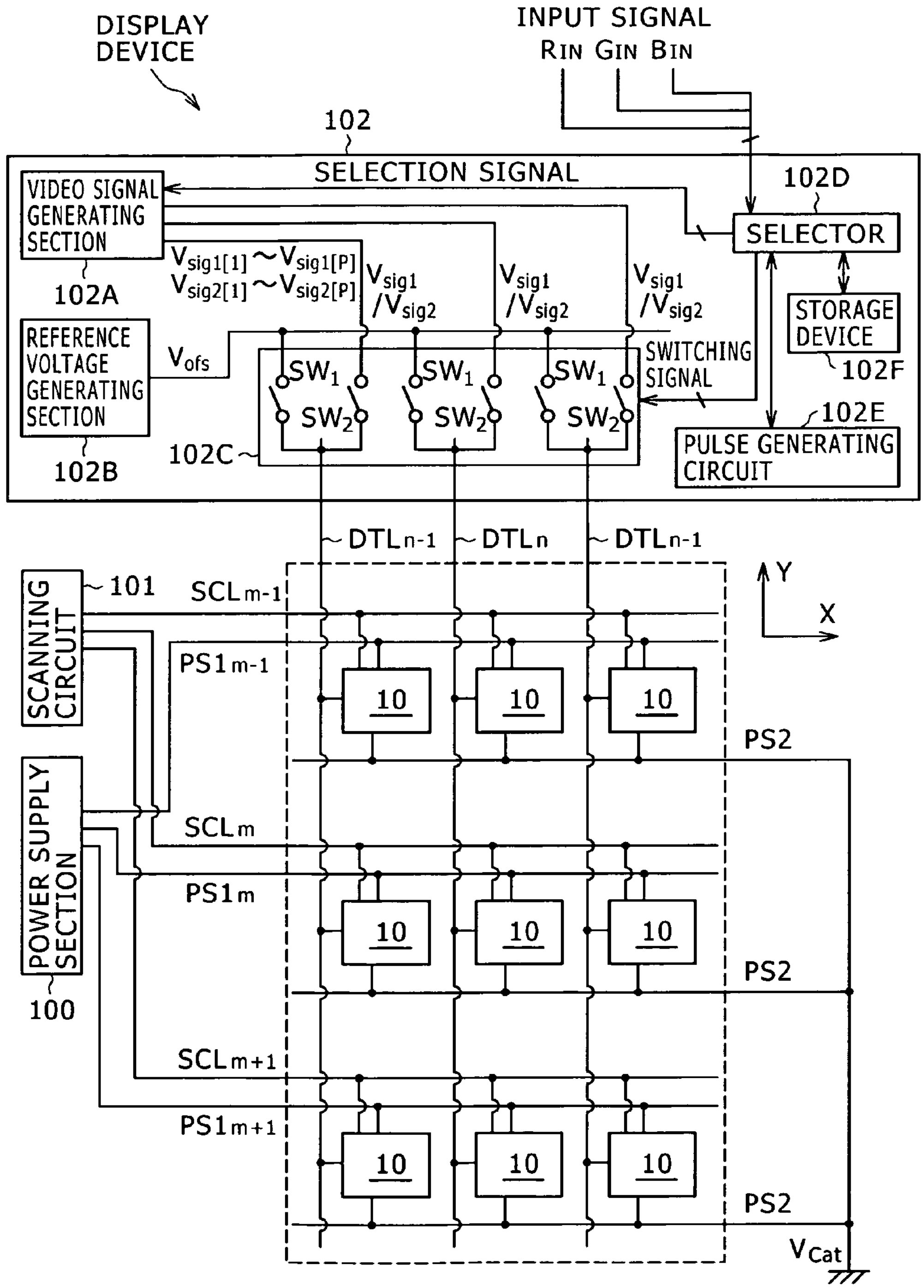
FIG. 1 is a conceptual diagram of a display device according to a first embodiment.

The present invention will hereinafter be described on the basis of embodiments with reference to the drawings. However, the present invention is not limited to the embodiments. Various numerical values and materials in the embodiments are illustrations. Incidentally, description will be made in the following order.

1. Description of Display Device, Driving Method of Display Device, and Driving Method of Display Element According to Present Invention and General Features 2. First Embodiment

[Description of Display Device, Driving Method of Display Device, and Driving Method of Display Element According to Present Invention and General Features]

In a display device, a driving method of the display device, and a driving method of a display element according to an embodiment of the present invention, it suffices for the values of a first video signal and a second video signal to change in at least two steps. It is desirable from a viewpoint of performing digital control that the values change in steps expressed by the powers of 2 such as 2, 4, 8, 16, 32 . . . . It is desirable from a viewpoint of commonality of a circuit for generating the first video signal and the second video signal that the values of the first video signal and the second video signal change in a same number of steps. However, the present invention is not limited to this.

When for example 8-bit gradation control is performed, internal processing can be performed as control exceeding eight bits. As an example, a constitution can be illustrated in which internal processing is set as 10-bit control, three bits are assigned to control of the value of the first video signal, four bits are assigned to control of length of a period during which the first video signal is applied to the gate electrode of a driving transistor in a first writing process, and three bits are assigned to control of the value of the second video signal, and a combination of the value of the first video signal, the value of the length of the period during which the first video signal is applied to the gate electrode of the driving transistor, and the value of the second video signal, which combination is suitable for display of a gradation of 0 to 255, is selected as appropriate from 1024 combinations. The same is true for a case of performing gradation control exceeding eight bits.

In the driving method of the display device or the driving method of the display element according to the embodiment of the present invention, the first writing process of applying the first video signal to the gate electrode of the driving transistor is performed, and next a second writing process of applying the second video signal to the gate electrode of the driving transistor is performed. Incidentally, the second writing process may be performed immediately after the first writing process is ended, or the second writing process may be performed after an interval from the end of the first writing process. Also in the display device according to the embodiment of the present invention, the second writing process may be performed immediately after the first writing process is ended, or the second writing process may be performed after an interval from the end of the first writing process.

In the driving method of the display device or the driving method of the display element according to the embodiment of the present invention, one electrode and another electrode forming a capacitance section are connected to another source/drain region and the gate electrode, respectively, of the driving transistor, and in the first writing process, a current flows through the driving transistor when the first video signal is applied to the gate electrode of the driving transistor, and potential of the other source/drain region of the driving transistor is changed on a basis of the value of the first video signal and a value of the length of the period during which the first video signal is applied to the gate electrode of the driving transistor, whereby a value of a voltage retained in the capacitance section is adjusted. A similar constitution can be adopted also in the display device according to the embodiment of the present invention.

The display device according to the embodiment of the present invention or the display device used in the driving method of the display device according to the embodiment of the present invention, the display device including a preferable constitution described above, further includes a plurality of scanning lines extending in a first direction and a plurality of data lines extending in a second direction, and the driving circuit further includes a writing transistor having a gate electrode connected to a scanning line, one source/drain region connected to a data line, and another source/drain region connected to the gate electrode of the driving transistor. In the driving method of the display device according to the embodiment of the present invention, the writing transistor is set in a conducting state by a scanning signal from the scanning line, the first video signal is applied from the data line to the gate electrode of the driving transistor, next the second video signal is applied from the data line to the gate electrode of the driving transistor, and then the scanning signal is ended to set the writing transistor in a non-conducting state, whereby the gate electrode of the driving transistor is set in a floating state. In addition, in the display device according to the embodiment of the present invention, the writing transistor is set in a conducting state by a scanning signal from the scanning line, the first video signal is applied from the data line to the gate electrode of the driving transistor, next the second video signal is applied from the data line to the gate electrode of the driving transistor, and then the scanning signal is ended to set the writing transistor in a non-conducting state, whereby the gate electrode of the driving transistor is set in a floating state.

The display device according to the embodiment of the present invention or the display device used in the driving method of the display device according to the embodiment of the present invention, the display device including various preferable constitutions described above, further includes a plurality of feeder lines extending in a first direction, and one source/drain region of the driving transistor is connected to a feeder line. In the driving method of the display device according to the embodiment of the present invention, the display device including the various preferable constitutions described above, a driving voltage is applied from the feeder line to one source/drain region of the driving transistor. Similarly, in the display device according to the embodiment of the present invention, the display device including the preferable constitutions described above, a driving voltage is applied from the feeder line to one source/drain region of the driving transistor.

In the driving method of the display device according to the embodiment of the present invention or the driving method of the display element according to the embodiment of the present invention, the display device or display element including the various preferable constitutions described above, before the first writing process, an initializing voltage such that a difference between the initializing voltage and a reference voltage exceeds a threshold voltage of the driving transistor is applied to one source/drain region of the driving transistor, and the reference voltage is applied to the gate electrode of the driving transistor, whereby potential of the gate electrode of the driving transistor and potential of the other source/drain region of the driving transistor are initialized, and next a threshold voltage cancelling process is performed, the threshold voltage cancelling process applying the driving voltage to one source/drain region of the driving transistor in a state of the reference voltage being applied to the gate electrode of the driving transistor, whereby the potential of the other source/drain region of the driving transistor is brought closer to a potential obtained by subtracting the threshold voltage of the driving transistor from the reference voltage. Similarly, in the display device according to the embodiment of the present invention including the various preferable constitutions described above, the initialization and the threshold voltage cancelling process are performed.

In the driving method of the display device performing the initialization and the threshold voltage cancelling process described above, the display device includes a plurality of scanning lines and a plurality of data lines described above, and when the driving circuit includes a writing transistor described above, the writing transistor is set in a conducting state by a scanning signal from a scanning line, and the first video signal, the second video signal, and the reference voltage are applied from a data line to the gate electrode of the driving transistor. When the display device includes a plurality of feeder lines described above, and one source/drain region of the driving transistor is connected to a feeder line, the driving voltage and the initializing voltage are applied from the feeder line to one source/drain region of the driving transistor. Also in a case where the display device according to the embodiment of the present invention, the display device including the various preferable constitutions described above, performs the initialization and the threshold voltage cancelling process, the first video signal, the second video signal, and the reference voltage are applied from a data line to the gate electrode of the driving transistor, and the driving voltage and the initializing voltage are applied from a feeder line to one source/drain region of the driving transistor.

When the potential of the other source/drain region of the driving transistor reaches the potential obtained by subtracting the threshold voltage of the driving transistor from the reference voltage as a result of the threshold voltage cancelling process, the driving transistor is set in a non-conducting state. When the potential of the other source/drain region of the driving transistor does not reach the potential obtained by subtracting the threshold voltage of the driving transistor from the reference voltage, on the other hand, the driving transistor is not set in a non-conducting state. The driving transistor does not necessarily need to be set in a non-conducting state as a result of the threshold voltage cancelling process.

The display device according to the embodiment of the present invention or the display device used in the driving method of the display device according to the embodiment of the present invention, the display device including the various preferable constitutions described above (which display devices may hereinafter be collectively referred to simply as the display device according to the embodiment of the present invention), may have a constitution for so-called monochrome display or may have a constitution for color display. For example, the display device can have a constitution in which one pixel is composed of a plurality of sub-pixels, specifically a color display constitution in which one pixel is formed of three sub-pixels, that is, a red light emitting sub-pixel, a green light emitting sub-pixel, and a blue light emitting sub-pixel. Further, one pixel can also be formed of one set obtained by further adding one kind of sub-pixel or a plurality of kinds of sub-pixels to the three kinds of sub-pixels (for example one set obtained by adding a sub-pixel emitting white light for luminance improvement, one set obtained by adding a sub-pixel emitting light of a complementary color to expand a color reproduction range, one set obtained by adding a sub-pixel emitting yellow light to expand the color reproduction range, or one set obtained by adding sub-pixels emitting yellow and cyan light to expand the color reproduction range).

Some of resolutions for image display, such as VGA (640, 480), S-VGA (800, 600), XGA (1024, 768), APRC (1152, 900), S-XGA (1280, 1024), U-XGA (1600, 1200), HD-TV (1920, 1080), and Q-XGA (2048, 1536) as well as (1920, 1035), (720, 480), (1280, 960) and the like, can be cited as examples of values of pixels of the display device. However, the present invention is not limited to these values.

In the display element forming the display device according to the embodiment of the present invention or the display element used in the driving method of the display element according to the embodiment of the present invention (which display elements may hereinafter be collectively referred to simply as the display element according to the embodiment of the present invention), an organic electroluminescence light emitting section, an LED light emitting section, a semiconductor laser light emitting section and the like can be cited as current driven type light emitting section. These light emitting sections can be formed by using known materials and known methods. From a viewpoint of forming a flat-panel display device for color display, the light emitting section is desirably an organic electroluminescence light emitting section among others. The organic electroluminescence light emitting section may be of a so-called top emission type or may be of a bottom emission type. The organic electroluminescence light emitting section can be formed of an anode electrode, a hole transporting layer, a light emitting layer, an electron transporting layer, a cathode electrode and the like.

In the display device, various wiring of the scanning lines, the data lines, the feeder lines and the like can have a known constitution and a known structure. In addition, various circuits such as a power supply section, a scanning circuit, a signal output circuit and the like can be formed by using known circuit elements and the like.

The transistor forming the driving circuit includes for example an n-channel type thin film transistor (TFT). The transistor forming the driving circuit may be of an enhancement type or may be of a depletion type. An LDD structure (Lightly Doped Drain structure) may be formed in an n-channel type transistor. In some cases, the LDD structure may be formed asymmetrically. For example, because a high current flows through the driving transistor at the time of light emission of the display element, it is possible to form the LDD structure only in one source/drain region serving as a drain region at the time of light emission. Incidentally, a p-channel type thin film transistor, for example, may also be used.

The capacitance section forming the driving circuit can be formed by one electrode, another electrode, and a dielectric layer interposed between the electrodes. The transistor and the capacitance section described above which constitute the driving circuit are formed in a certain plane (for example formed on a support). The light emitting section is for example formed above the transistor and the capacitance section forming the driving circuit with an interlayer insulating layer interposed between the light emitting section and the driving circuit. In addition, the other source/drain region of the driving transistor is connected to one terminal of the light emitting section (the anode electrode or the like provided to the light emitting section) via a contact hole, for example. Incidentally, the transistor may also be formed in a semiconductor substrate or the like.

Constituent materials for the supporting body and a substrate to be described later include glass materials such as high strain point glass, soda glass ($Na_2O.CaO.SiO_2$), borosilicate glass ($Na_2O.B_2O_3.SiO_2$), forsterite ($2MgO.SiO_2$), lead glass ($Na_2O.PbO.SiO_2$) and the like as well as polymeric materials having flexibility, for example polymeric materials exemplified by polyethersulfone (PES), polyimide, polycarbonate (PC), and polyethylene terephthalate (PET). Incidentally, various coatings may be applied to the surfaces of the supporting body and the substrate. The constituent materials for the supporting body and the substrate may be the same or may be different from each other. A display device having flexibility can be formed when the supporting body and the substrate formed of a polymeric material having flexibility are used.

A term "one source/drain region" of two source/drain regions of one transistor may be used in a sense of a source/drain region connected to a power supply side. In addition, a transistor being in a conducting state means a state of a channel being formed between the source/drain regions. It does not matter whether or not a current flows from one source/drain region to the other source/drain region of the transistor. A transistor being in a non-conducting state, on the other hand, means a state of no channel being formed between the source/drain regions. In addition, the source/drain regions can be not only formed of a conductive material such as polysilicon containing an impurity, amorphous silicon or the like but also formed of a metal, an alloy, conductive particles, a laminated structure of these materials, or a layer made of an organic material (conductive polymer).

Conditions shown in various equations in the present specification are satisfied not only when the equations precisely hold mathematically but also when the equations hold substantially. As to whether the equations hold, various variations occurring in design or manufacture of the display element and the display device are tolerated.

In a timing chart to be used in the following description, length (time length) of an axis of abscissas indicating each period is shown schematically, and does not represent the ratio of time length of each period. The same is true for an axis of ordinates. In addition, the shapes of waveforms in the timing chart are also shown schematically.

FIRST EMBODIMENT

A first embodiment relates to a display device, a driving method of the display device, and a driving method of a display element according to the present invention.

Figure 2:
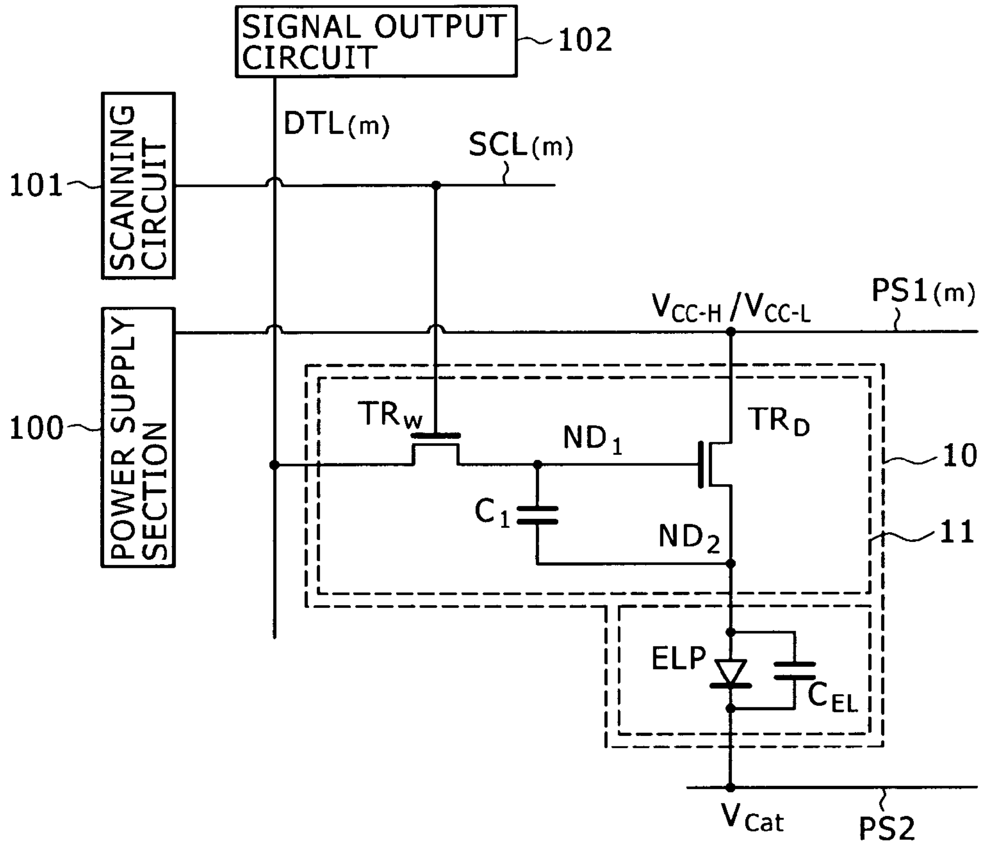
FIG. 2 is a diagram of an equivalent circuit of a display element including a driving circuit.

FIG. 1 is a conceptual diagram of a display device according to the first embodiment. FIG. 2 is a diagram of an equivalent circuit of a display element 10 including a driving circuit 11. As shown in FIG. 1 and FIG. 2, the display device according to the first embodiment includes a signal output circuit 102, a scanning circuit 101, a power supply section 100, and display elements 10 arranged in the form of a two-dimensional matrix and each having a driving circuit 11 and a current driven type light emitting section ELP.

A total of N×M display elements 10 are arranged in the form of a two-dimensional matrix with N display elements 10 in a first direction (X-direction in FIG. 1, which direction may hereinafter be referred to as a row direction) and M display elements 10 in a second direction (Y-direction in FIG. 1, which direction may hereinafter be referred to as a column direction). The number of rows of the display elements 10 is M, and the number of display elements 10 forming each row is N. Incidentally, while FIG. 1 shows 3×3 display elements 10, this is a mere illustration.

The display device further includes a plurality of (M) scanning lines SCL connected to the scanning circuit 101 and extending in the first direction, a plurality of (N) data lines DTL connected to the signal output circuit 102 and extending in the second direction, and a plurality of (M) feeder lines PS1 connected to the power supply section 100 and extending in the first direction. Display elements 10 in an mth row (where m=1, 2, . . . , M) are connected to an mth scanning line $SCL_m$ and an mth feeder line PS$\mathbf{1}_m$, and form one display element row. In addition, display elements 10 in an nth column (where n=1, 2, . . . , N) are connected to an nth data line $DTL_n$.

As shown in FIG. 2, a driving circuit 11 includes at least a driving transistor $TR_D$ having a gate electrode and source/drain regions and a capacitance section $C_1$. A current flows through a light emitting section ELP via the source/drain regions of the driving transistor $TR_D$. As will be described later in detail with reference to FIG. 4, the display element 10 has a structure in which the driving circuit 11 and the light emitting section ELP connected to the driving circuit 11 are laminated. The light emitting section ELP is formed by an organic electroluminescence light emitting section.

Figure 13:
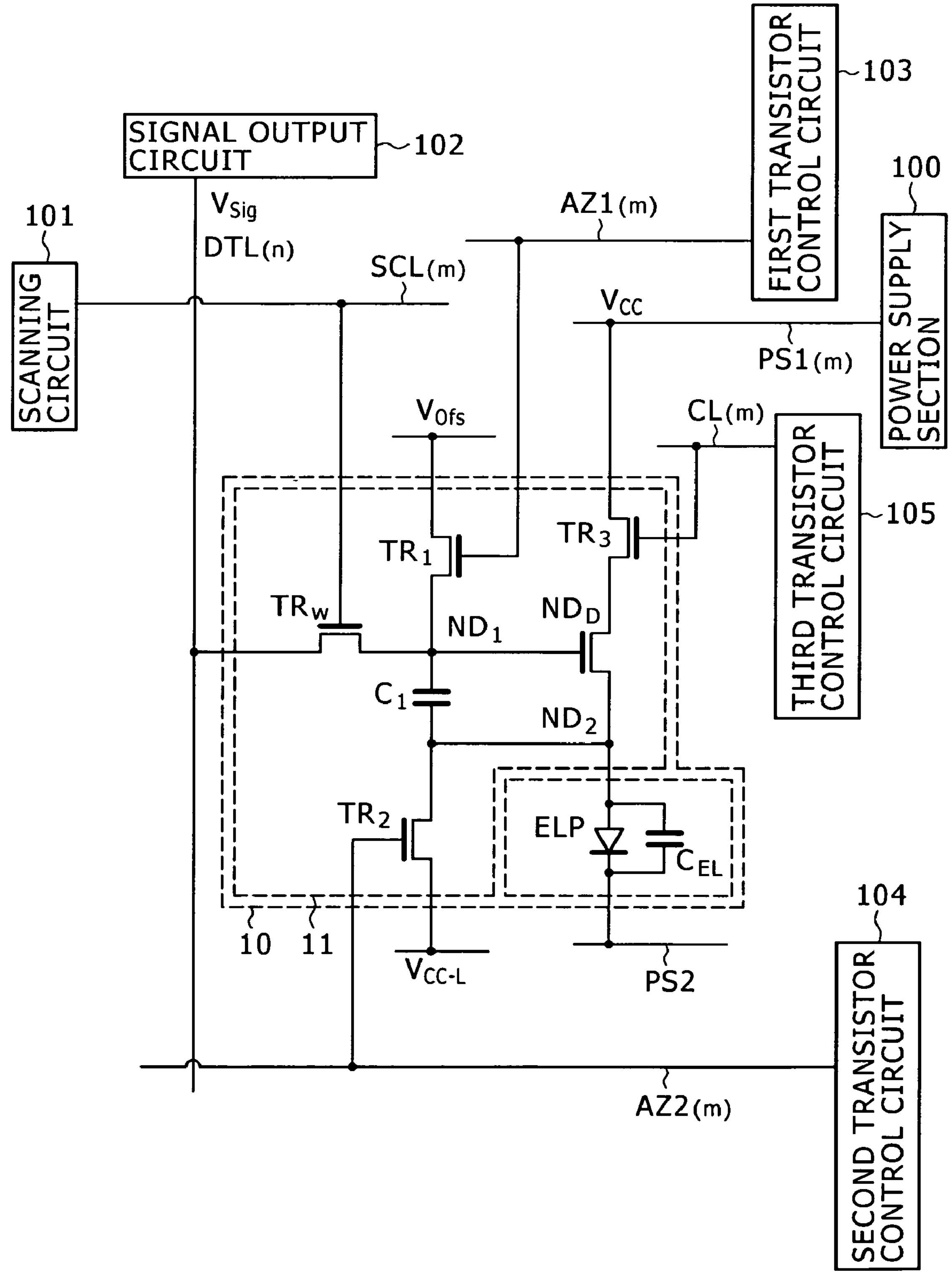
FIG. 13 is a diagram of an equivalent circuit of a display element including a driving circuit.

The driving circuit 11 further includes a writing transistor $TR_W$ in addition to the driving transistor $TR_D$. The driving transistor $TR_D$ and the writing transistor $TR_W$ are formed by an n-channel type TFT. Incidentally, for example, the writing transistor $TR_W$ can also be formed by a p-channel type TFT. The driving circuit 11 may further include other transistors, as shown in FIG. 13 to be described later, for example.

The capacitance section $C_1$ is used to retain the voltage of the gate electrode of the driving transistor $TR_D$ with respect to the source region of the driving transistor $TR_D$ (so-called gate-to-source voltage). The "source region" in this case refers to the source/drain region on a side acting as a "source region" when the light emitting section ELP emits light. In a light emitting state of the display element 10, one source/drain region (a side connected to a feeder line PS1 in FIG. 2) of the driving transistor $TR_D$ acts as a drain region, and the other source/drain region (a side connected to one terminal of the light emitting section ELP, specifically the anode electrode of the light emitting section ELP) of the driving transistor $TR_D$ acts as a source region. One electrode and another electrode forming the capacitance section $C_1$ are connected to the other source/drain region and the gate electrode, respectively, of the driving transistor $TR_D$.

The writing transistor $TR_W$ has a gate electrode connected to a scanning line SCL, one source/drain region connected to a data line DTL, and another source/drain region connected to the gate electrode of the driving transistor $TR_D$.

The gate electrode of the driving transistor $TR_D$ forms a first node $ND_1$ to which the other source/drain region of the writing transistor $TR_W$ and the other electrode of the capacitance section $C_1$ are connected. The other source/drain region of the driving transistor $TR_D$ forms a second node $ND_2$ to which one electrode of the capacitance section $C_1$ and the anode electrode of the light emitting section ELP are connected.

Another terminal (specifically a cathode electrode) of the light emitting section ELP is connected to a second feeder line PS2. As shown in FIG. 1, the second feeder line PS2 is common to all the display elements 10.

A predetermined voltage $V_{Cat}$ to be described later is applied from the second feeder line PS2 to the cathode electrode of the light emitting section ELP. The capacitance of the light emitting section ELP is denoted by a reference $C_{EL}$. In addition, a threshold voltage necessary for the light emission of the light emitting section ELP is denoted as $V_{th\text{-}EL}$. That is, the light emitting section ELP emits light when a voltage equal to or higher than $V_{th\text{-}EL}$ is applied between the anode electrode and the cathode electrode of the light emitting section ELP.

The light emitting section ELP for example has a known constitution or structure composed of the anode electrode, a hole transporting layer, a light emitting layer, an electron transporting layer, the cathode electrode and the like. The constitution or structure of the power supply section 100 and the scanning circuit 101 can be a known constitution or structure. The constitution of the signal output circuit 102 will be described later.

In this case, voltage settings of the driving transistor $TR_D$ are made such that the driving transistor $TR_D$ operates in a saturation region in the light emitting state of the display element 10, and the driving transistor $TR_D$ is driven so as to pass a drain current $I_{ds}$ according to the following Equation (1) in the light emitting state of the display element 10. As described above, in the light emitting state of the display element 10, one source/drain region of the driving transistor $TR_D$ acts as a drain region, and the other source/drain region of the driving transistor $TR_D$ acts as a source region. For convenience of description, in the following description, one source/drain region of the driving transistor $TR_D$ may be referred to simply as a drain region, and the other source/drain region of the driving transistor $TR_D$ may be referred to simply as a source region.

$$k \equiv (1/2)\cdot(W/L)\cdot C_{OX}$$

$$I_{ds} = k\cdot\mu\cdot(V_{gs} - V_{th})^2 \tag{1}$$

where μ is effective mobility, L is channel length, W is channel width, $V_{gs}$ is the voltage of the gate electrode with respect to the source region, $V_{th}$ is threshold voltage, and $C_{OX}$ is (Relative Dielectric Constant of Gate Insulating Layer)×(Dielectric Constant of Vacuum)/(Thickness of Gate Insulating Layer).

The light emitting section ELP of the display element 10 emits light when the drain current $I_{ds}$ flows through the light emitting section ELP. Further, a light emitting state (luminance) in the light emitting section ELP of the display element 10 is controlled according to the magnitude of the value of the drain current $I_{ds}$.

The conducting state/non-conducting state of the writing transistor $TR_W$ is controlled by a scanning signal from the scanning line SCL connected to the gate electrode of the writing transistor $TR_W$, specifically a scanning signal from the scanning circuit 101.

Various signals and voltages are applied from the data line DTL to one source/drain region of the writing transistor $TR_W$ on the basis of operation of the signal output circuit 102. Specifically, a first video signal $V_{Sig1}$, a second video signal $V_{Sig2}$, and a predetermined reference voltage $V_{Ofs}$ to be described later are applied from the signal output circuit 102. Incidentally, another voltage may be further applied in addition to $V_{Sig1}$, $V_{Sig2}$, and $V_{Ofs}$.

As shown in FIG. 1, the signal output circuit 102 includes: a video signal generating section 102A for generating the first video signal $V_{Sig1}$ and the second video signal $V_{Sig2}$; a reference voltage generating section 102B for generating the reference voltage $V_{Ofs}$; a signal switching section 102C having switches $SW_1$ and $SW_2$ for connecting the video signal generating section 102A and the reference voltage generating section 102B to the data line DTL; a selector 102D for controlling the operation of the video signal generating section 102A and the signal switching section 102C; a pulse generating circuit 102E for generating various pulses; and a storage device (memory) 102F in which data shown in FIG. 12 to be described later is stored. Incidentally, the constitution of the signal output circuit 102 is an illustration, and is not limited to this illustration.

The display device is subjected to line-sequential scanning in row units. In each horizontal scanning period, the switch $SW_1$ in the signal switching section 102C shown in FIG. 1 is first set in a conducting state (the switch $SW_2$ is in a non-conducting state). Thereafter, the switch $SW_1$ is set in a non-conducting state, and the switch $SW_2$ is set in a conducting state. The non-conducting state/conducting state of the switches $SW_1$ and $SW_2$ is next changed as appropriate. In the first embodiment, the luminance of light emitted by the light emitting section ELP is controlled by selecting the values of the first video signal $V_{Sig1}$ and the second video signal $V_{Sig2}$ and controlling timing of changing the switches $SW_1$ and $SW_2$ as appropriate according to the value (whose maximum is 255) of an input signal supplied externally and discreted into eight bits, for example.

Figure 3:
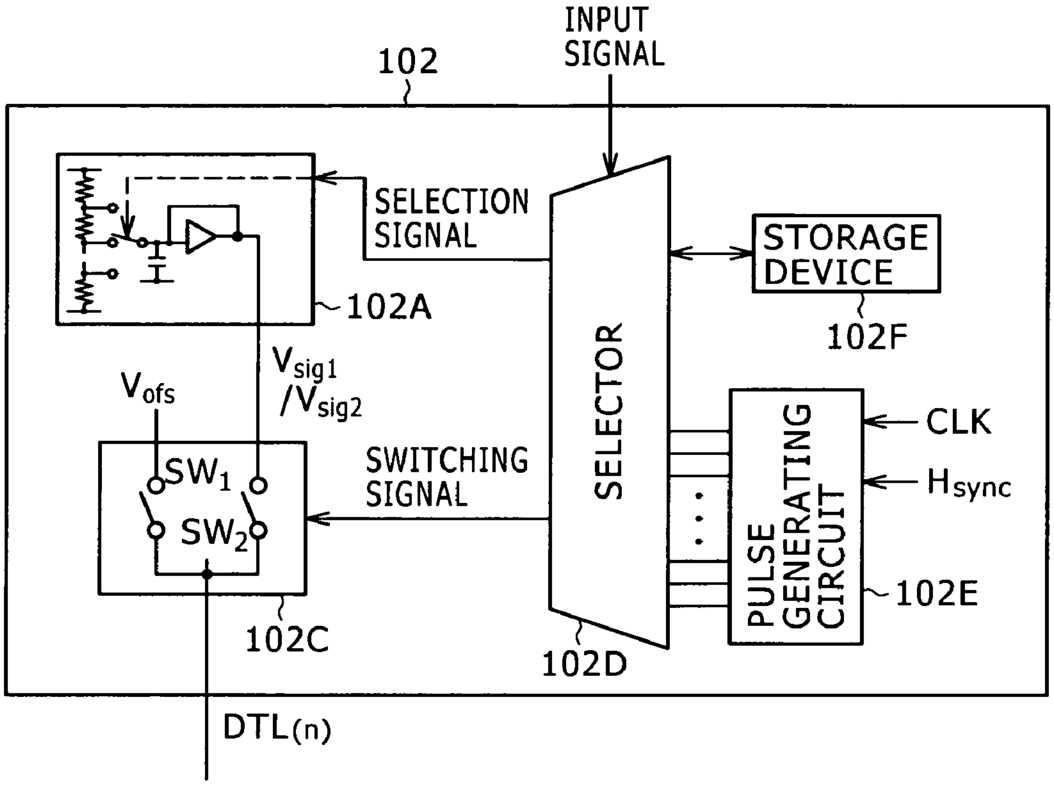
FIG. 3 is a schematic block diagram for one channel of a signal output circuit.

FIG. 3 is a schematic block diagram for one channel of the signal output circuit 102. The pulse generating circuit 102E is supplied with a horizontal synchronizing signal $H_{sync}$ serving as a reference for start timing of a horizontal scanning period and a reference clock CLK from a control section not shown in the figure, for example. The pulse generating circuit 102E generates various pulses having different timing of rising edges and falling edges from the start timing of the horizontal synchronizing signal $H_{sync}$ on the basis of the horizontal synchronizing signal $H_{sync}$ and the reference clock CLK.

The selector 102D refers to the data stored in the storage device 102F on the basis of the value of the input signal input externally. Then, on the basis of the data that is referred to, the selector 102D sequentially supplies selection signals for selecting kinds (values) of the first video signal $V_{Sig1}$ and the second video signal $V_{Sig2}$ to the video signal generating section 102A, and selects a pulse from the various pulses generated by the pulse generating circuit 102E as appropriate and then supplies the pulse as a switching signal to the signal switching section 102C. In a horizontal scanning period, the data line DTL is first supplied with the reference voltage $V_{Ofs}$, next supplied with the first video signal $V_{Sig1}$ on the basis of the switching signal, and thereafter supplied with the second video signal $V_{Sig2}$. Incidentally, in the first embodiment, the reference voltage $V_{Ofs}$ is supplied during an interval after completion of supply of the first video signal $V_{Sig1}$ to the data line and before supply of the second video signal $V_{Sig2}$.

Figure 4:
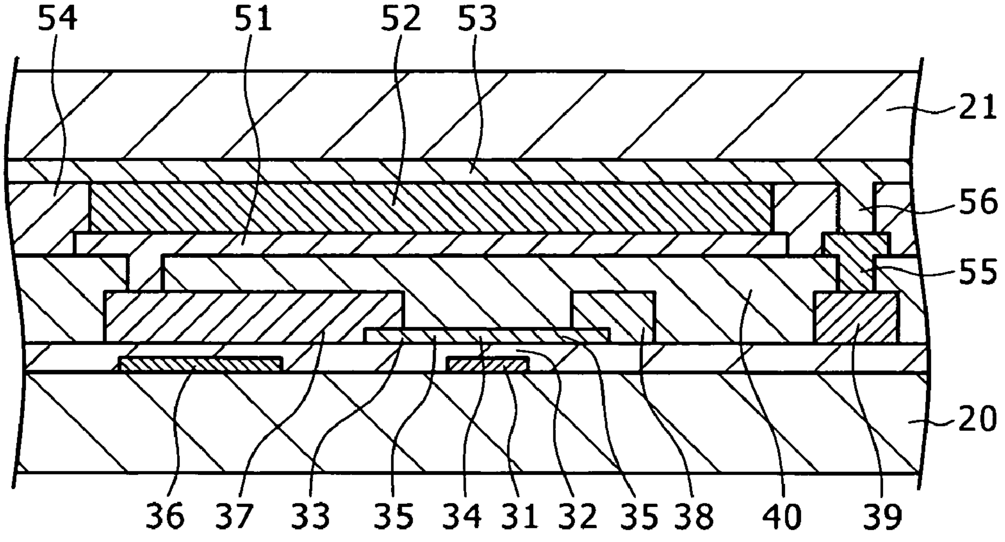
FIG. 4 is a schematic partially sectional view of a part of the display device.

FIG. 4 is a schematic partially sectional view of a part of the display device. The transistors $TR_D$ and $TR_W$ and the capacitance section $C_1$ forming the driving circuit 11 are formed on a supporting body 20. The light emitting section ELP is for example formed above the transistors $TR_D$ and $TR_W$ and the capacitance section $C_1$ forming the driving circuit 11 with an interlayer insulating layer 40 interposed between the light emitting section ELP and the driving circuit 11. In addition, the other source/drain region of the driving transistor $TR_D$ is connected to the anode electrode provided to the light emitting section ELP via a contact hole. Incidentally, only the driving transistor $TR_D$ is shown in FIG. 4. The other transistor is hidden from view.

More specifically, the driving transistor $TR_D$ is formed of a gate electrode 31, a gate insulating layer 32, source/drain regions 35 and 35 provided in a semiconductor layer 33, and a channel forming region 34 to which a part of the semiconductor layer 33 between the source/drain regions 35 and 35 corresponds. The capacitance section $C_1$ is composed of another electrode 36, a dielectric layer formed of an extending part of the gate insulating layer 32, and one electrode 37. The gate electrode 31, a part of the gate insulating layer 32, and the other electrode 36 forming the capacitance section $C_1$ are formed on the supporting body 20. The one source/drain region 35 of the driving transistor $TR_D$ is connected to wiring 38 (corresponding to the feeder line PS1), and the other source/drain region 35 of the driving transistor $TR_D$ is connected to the one electrode 37. The driving transistor $TR_D$, the capacitance section $C_1$ and the like are covered with the interlayer insulating layer 40. The light emitting section ELP composed of an anode electrode 51, a hole transporting layer, a light emitting layer, an electron transporting layer, and a cathode electrode 53 is disposed on the interlayer insulating layer 40. Incidentally, in the drawing, the hole transporting layer, the light emitting layer, and the electron transporting layer are represented by one layer 52. A second interlayer insulating layer 54 is disposed on a part of the interlayer insulating layer 40 on which part the light emitting section ELP is not disposed. A transparent substrate 21 is disposed on the second interlayer insulating layer 54 and the cathode electrode 53. Light generated in the light emitting layer passes through the substrate 21 and goes outside. Incidentally, the one electrode 37 and the anode electrode 51 are connected to each other via a contact hole provided in the interlayer insulating layer 40. The cathode electrode 53 is connected to wiring 39 (corresponding to the second feeder line PS2) disposed on an extending part of the gate insulating layer 32 via contact holes 56 and 55 provided in the second interlayer insulating layer 54 and the interlayer insulating layer 40.

A method for manufacturing the display device shown in FIG. 4 and the like will be described. First, various wiring of the scanning line SCL and the like, the electrodes forming the capacitance section $C_1$, the transistor including the semiconductor layer, the interlayer insulating layers, the contact holes and the like are appropriately formed on the supporting body 20 by a known method. Next, light emitting sections ELP arranged in the form of a matrix are formed by performing film formation and patterning by a known method. Then, the supporting body 20 and the substrate 21 that have undergone the above steps are opposed to each other, the periphery is sealed, and then for example connection with an external circuit is established, whereby the display device can be obtained.

The display device according to the first embodiment is a display device for color display which includes a plurality of display elements 10 (for example N×M=1920×480). Each display element 10 forms a sub-pixel, one pixel is formed by a group of a plurality of sub-pixels, and pixels are arranged in the form of a two-dimensional matrix in a row direction and a column direction. One pixel includes three kinds of sub-pixels, that is, a red light emitting sub-pixel for emitting red light, a green light emitting sub-pixel for emitting green light, and a blue light emitting sub-pixel for emitting blue light, which sub-pixels are arranged in the extending direction of the scanning line SCL.

Description will next be made of the driving method of the display device according to the first embodiment and the driving method of the display element using the display device according to the first embodiment (which driving methods will hereinafter be abbreviated simply as a driving method according to the first embodiment). The display device includes (N/3)xM pixels arranged in the form of a two-dimensional matrix. Suppose that a display frame rate is FR (times/second). Display elements 10 forming (N/3) respective pixels (N sub-pixels) arranged in an mth row are driven simultaneously. In other words, timing of emission/non-emission of the N display elements 10 arranged along the first direction is controlled in a row unit to which the N display elements 10 belong. A scanning period per row when the display device is scanned on a line-sequential basis in row units, or more specifically one horizontal scanning period (so-called 1 H), is less than (1/FR)x(1/M) seconds.

A display element 10 located in an mth row and in an nth column will hereinafter be referred to as an (n, m)th display element 10 or an (n, m)th sub-pixel. Various processes (a threshold voltage cancelling process, a first writing process, and a second writing process to be described later) are performed before completion of a horizontal scanning period corresponding to the display elements 10 arranged in the mth row (which horizontal scanning period may hereinafter be referred to as an mth horizontal scanning period $H_m$). Incidentally, the first writing process and the second writing process are performed within the mth horizontal scanning period $H_m$.

In the following description, voltage or potential values are set as follows. However, the following are values for description only, and the voltage or potential values are not limited to the following values.

$V_{Sig1}$: first video signal
. . . 2 to 8 volts $V_{Sig2}$: second video signal
. . . 2 to 8 volts $V_{Ofs}$ reference voltage applied to the gate electrode of the driving transistor $TR_D$ (first node $ND_1$).
. . . 0 volts $V_{CC-H}$: driving voltage for passing current through the light emitting section ELP
. . . 20 volts $V_{CC-L}$: initializing voltage for initializing the potential of the other source/drain region of the driving transistor $TR_D$ (second node $ND_2$)
. . . −10 volts $V_{th}$: threshold voltage of the driving transistor $TR_D$
. . . 3 volts $V_{Cat}$: voltage applied to the cathode electrode of the light emitting section ELP
. . . 0 volts $V_{th-EL}$: threshold voltage of the light emitting section ELP
. . . 4 volts In the first embodiment, description will be made supposing that the values of the first video signal $V_{Sig1}$ and the second video signal $V_{Sig2}$ change in P steps (where P is a natural number of two or more) and that the value of the length of a period during which the first video signal $V_{Sig1}$ is applied to the gate electrode of the driving transistor $TR_D$ changes in Q steps (where Q is a natural number of three or more).

When it is to be explicitly indicated that the first video signal $V_{Sig1}$ is a video signal at a pth step (where p=1, 2, . . . , P), the first video signal $V_{Sig1}$ is expressed as a video signal $V_{Sig1[p]}$. Similarly, when it is to be explicitly indicated that the second video signal $V_{Sig2}$ is a video signal at a pth step, the second video signal $V_{Sig2}$ is expressed as a video signal $V_{Sig2[p]}$. In addition, suppose that $V_{Sig1[1]}$ and $V_{Sig2[1]}$ are 2 volts and $V_{Sig1[P]}$ and $V_{Sig2[P]}$ are 8 volts, and that the values of the first video signal $V_{Sig1[p]}$ and the second video signal $V_{Sig2[p]}$ change linearly according to the value of "p."

Figure 5:
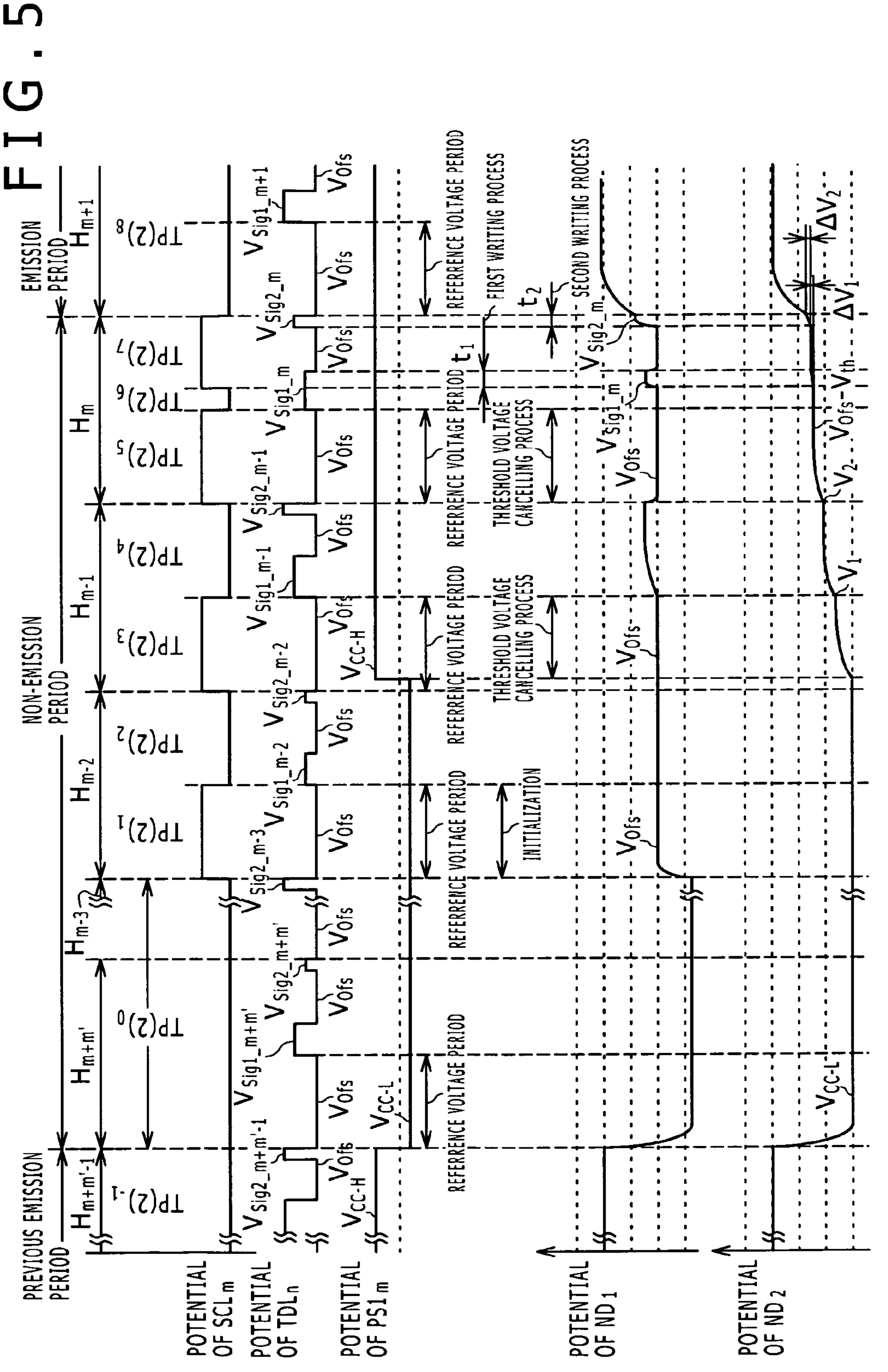
FIG. 5 is a schematic diagram of a timing chart of assistance in explaining operation of an (n, m)th display element in a driving method of the display device according to the first embodiment.

FIG. 5 is a timing chart of assistance in explaining the operation of the (n, m)th display element 10 in the driving method according to the first embodiment. The conducting state/non-conducting state and the like of each transistor forming the driving circuit 11 in the driving method according to the first embodiment will be schematically shown in FIGS. 6A to 6O.

As shown in FIG. 5, in each horizontal scanning period, a reference voltage $V_{Ofs}$, a first video signal $V_{Sig1}$, and a second video signal $V_{Sig2}$ are sequentially supplied from the signal output circuit 102 to the data line $DTL_n$. Incidentally, as described above, in the first embodiment, the reference voltage $V_{Ofs}$ is supplied between the first video signal $V_{Sig1}$ and the second video signal $V_{Sig2}$.

Specifically, in correspondence with the mth horizontal scanning period $H_m$ in a present display frame, the data line $DTL_n$ is first supplied with the reference voltage $V_{Ofs}$, next supplied with the first video signal $V_{Sig1}$ corresponding to the (n, m)th sub-pixel (which first video signal $V_{Sig1}$ may be expressed as $V_{Sig1\_m}$ for convenience, the same applying to other first video signals), thereafter supplied with the reference voltage $V_{Ofs}$, and next supplied with the second video signal $V_{Sig2}$ corresponding to the (n, m)th sub-pixel (which second video signal $V_{Sig2}$ may be expressed as $V_{Sig2\_m}$ for convenience, the same applying to other second video signals).

In the first embodiment, the reference voltage $V_{Ofs}$ is supplied to the data line $DTL_n$ for a predetermined fixed period (which may hereinafter be referred to as a reference voltage period), which period is determined in design, in the first half of each horizontal scanning period. Start timing and end timing of [period-TP(2)$_1$], [period-TP(2)$_3$], and [period-TP(2)$_5$] shown in FIG. 5 are set so as to coincide with start timing and end timing of the reference voltage periods.

In the display device according to the first embodiment, in a state of a predetermined driving voltage $V_{CC-H}$ being applied to one source/drain region of the driving transistor $TR_D$ on the basis of the operation of the power supply section 100, the first writing process is performed by applying the first video signal $V_{Sig1}$ to the gate electrode of the driving transistor $TR_D$ on the basis of the operation of the signal output circuit 102, the second writing process is next performed by applying the second video signal $V_{Sig2}$ to the gate electrode of the driving transistor $TR_D$ on the basis of the operation of the signal output circuit 102, and thereafter the gate electrode of the driving transistor $TR_D$ is set in a floating state on the basis of the operation of the scanning circuit 101. Thereby a current corresponding to the value of a voltage retained in the capacitance section $C_1$ for retaining the voltage of the gate electrode of the driving transistor $TR_D$ with respect to the source region of the driving transistor $TR_D$ flows through the light emitting section ELP via the driving transistor $TR_D$, so that the light emitting section ELP emits light. The length of a period during which the first video signal $V_{Sig1}$ is applied to the gate electrode of the driving transistor $TR_D$ in the first writing process is adjusted. The luminance of light emitted by the light emitting section is controlled on the basis of the value of the first video signal $V_{Sig1}$, the value of the length of the period during which the first video signal $V_{Sig1}$ is applied to the gate electrode of the driving transistor $TR_D$, and the value of the second video signal $V_{Sig2}$.

In the driving method according to the first embodiment, within [period-TP(2)$_7$] shown in FIG. 5, in a state of a predetermined driving voltage $V_{CC-H}$ being applied to one source/drain region of the driving transistor $TR_D$, the first writing process of applying the first video signal $V_{Sig1}$ to the gate electrode of the driving transistor $TR_D$ is performed, the second writing process of applying the second video signal $V_{Sig2}$ to the gate electrode of the driving transistor $TR_D$ is next performed, and thereafter the gate electrode of the driving transistor $TR_D$ is set in a floating state. Thereby a current corresponding to the value of a voltage retained in the capacitance section $C_1$ for retaining the voltage of the gate electrode of the driving transistor $TR_D$ with respect to the source region of the driving transistor $TR_D$ flows through the light emitting section ELP via the driving transistor $TR_D$, so that the light emitting section ELP emits light. The length of a period during which the first video signal $V_{Sig1}$ is applied to the gate electrode of the driving transistor $TR_D$ in the first writing process is adjusted. Therefore the luminance of light emitted by the light emitting section is controlled on the basis of the value of the first video signal $V_{Sig1}$, the value of the length of the period during which the first video signal $V_{Sig1}$ is applied to the gate electrode of the driving transistor $TR_D$, and the value of the second video signal $V_{Sig2}$.

For convenience of description, operations from [period-TP(2)$_5$] to [period-TP(2)$_7$] included in the mth horizontal scanning period $H_m$ and an operation in [period-TP(2)$_8$] will be described first. Details of the whole of operation from [period-TP(2)$_{-1}$] to [period-TP(2)$_8$] shown in FIG. 5 will be described later.

Figure 6A:
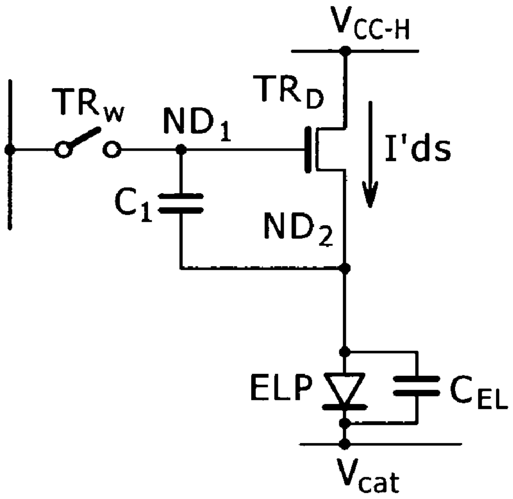
FIGS. 6A to 6O are diagrams schematically showing the conducting state/non-conducting state and the like of each transistor forming the driving circuit of a display element.
Figure 6B:
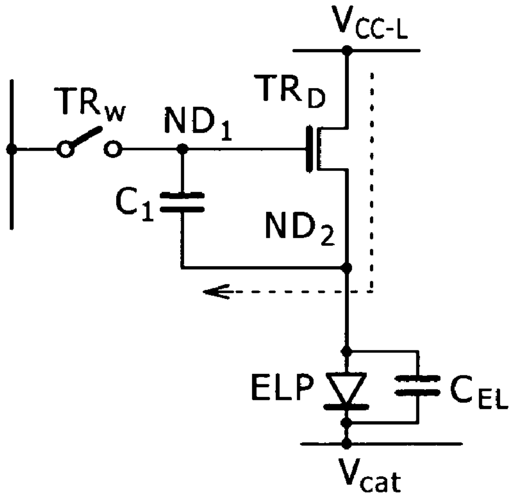
Figure 6C:
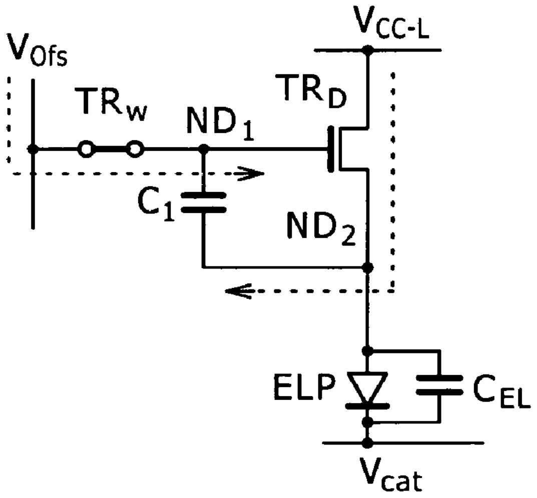
Figure 6D:
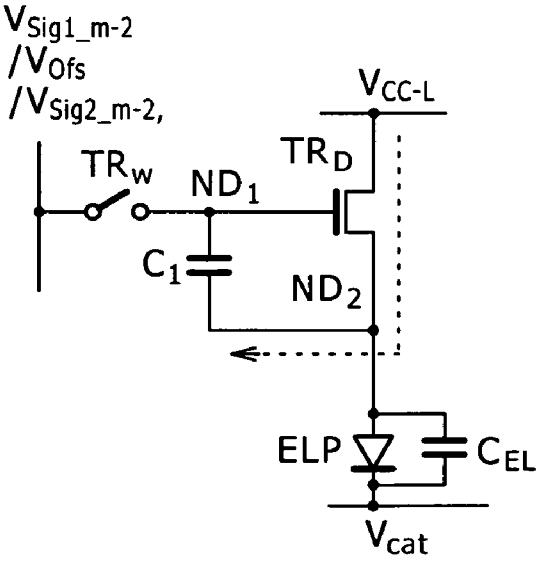
Figure 6E:
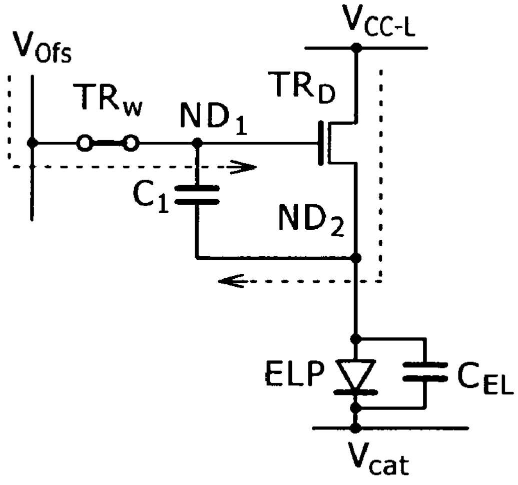
Figure 6F:
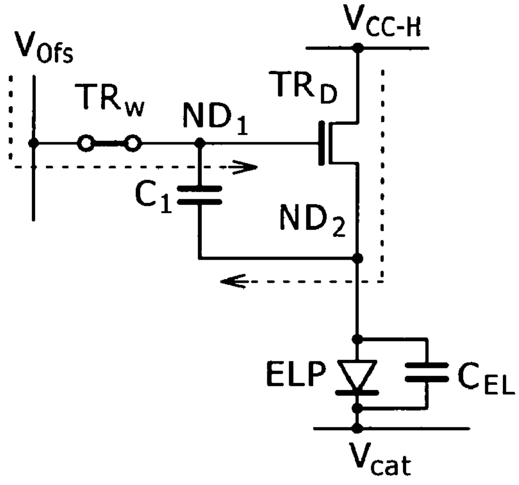
Figure 6G:
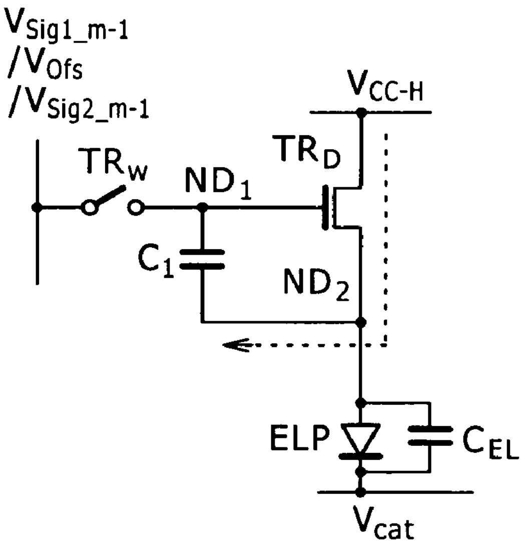
Figure 6H:
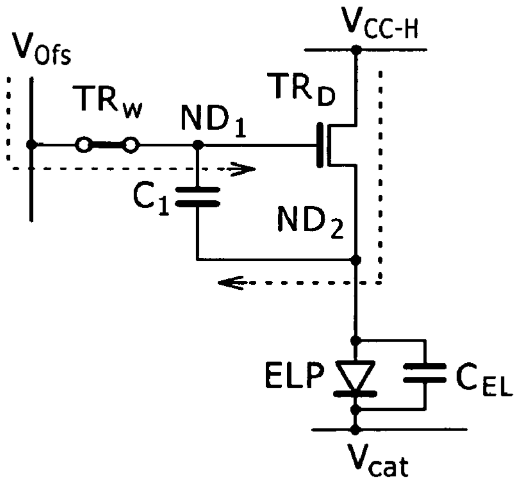
Figure 6I:
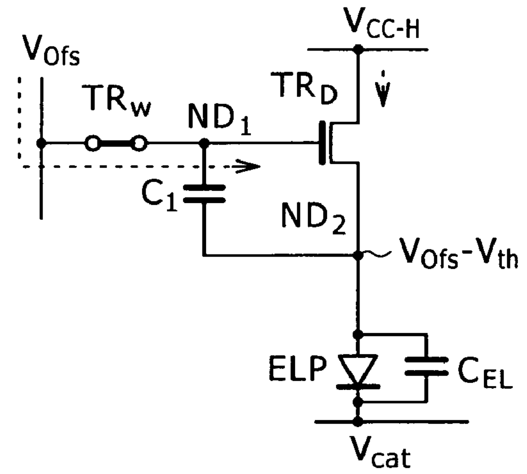

[period-TP(2)$_5$] (see FIG. 5, FIG. 6H, and FIG. 6I)

As will be described later in detail, in this [period-TP(2)$_5$], the reference voltage $V_{Ofs}$ is supplied from the signal output circuit 102 to the data line $DTL_n$. The driving voltage $V_{CC-H}$ is applied from the feeder line PS1 to the other source/drain region of the driving transistor $TR_D$ on the basis of the operation of the power supply section 100. The potential of the second node $ND_2$ becomes $(V_{Ofs}-V_{th})$ as a result of the threshold voltage cancelling process to be described later. The potential of the second node $ND_2$ is determined depending on only the threshold voltage $V_{th}$ of the driving transistor $TR_D$ and the reference voltage $V_{Ofs}$ (FIG. 6I). Then, in end timing of [period-TP(2)$_5$], a scanning signal from the scanning line SCL ends to change the writing transistor $TR_W$ from a conducting state to a non-conducting state on the basis of the operation of the scanning circuit 101. [period-TP(2)$_6$] (see FIG. 5 and FIG. 6J)

The non-conducting state of the writing transistor $TR_W$ is maintained during this period. The reference voltage period ends, and the first video signal $V_{Sig1\_m}$ is supplied to the data line $DTL_n$. Assuming that the driving transistor $TR_D$ reached a non-conducting state in [period-TP(2)$_5$], the potentials of the first node $ND_1$ and the second node $ND_2$ do not change essentially.

[period-TP(2)$_7$] (see FIG. 5, FIGS. 6K to 6M)

Within this [period-TP(2)$_7$], in a state of the driving voltage $V_{CC-H}$ being applied from the feeder line PS1 to one source/drain region of the driving transistor $TR_D$ on the basis of the operation of the power supply section 100, the writing transistor $TR_W$ is set in a conducting state by a scanning signal from the scanning line SCL on the basis of the operation of the scanning circuit 101. On the basis of the operation of the signal output circuit 102, the first writing process of applying the first video signal $V_{Sig1\_m}$ from the data line $DTL_n$ to the gate electrode of the driving transistor $TR_D$ is performed, and next the second writing process of applying the second video signal $V_{Sig2\_m}$ from the data line $DTL_n$ to the gate electrode of the driving transistor $TR_D$ is performed.

In start timing of [period-TP(2)$_7$], the writing transistor $TR_W$ is changed from a non-conducting state to a conducting state on the basis of the operation of the scanning circuit 101. The first video signal $V_{Sig1\_m}$ continues being supplied to the data line $DTL_n$ in an early part of [period-TP(2)$_7$]. The first writing process is performed by applying the first video signal $V_{Sig1\_m}$ from the data line $DTL_n$ to the gate electrode of the driving transistor $TR_D$. Because the gate-to-source voltage of the driving transistor $TR_D$ exceeds the threshold voltage $V_{th}$, the driving transistor $TR_D$ is set in a conducting state.

Figure 6J:
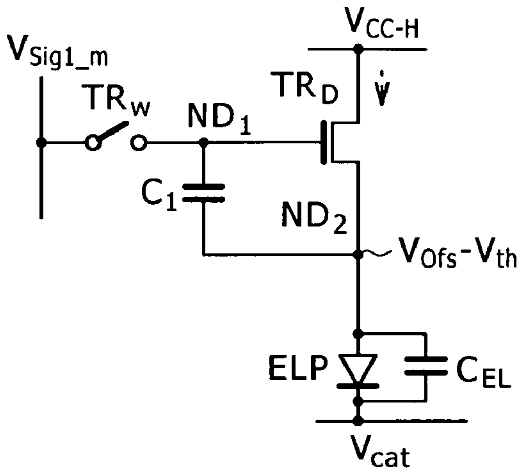
Figure 6K:
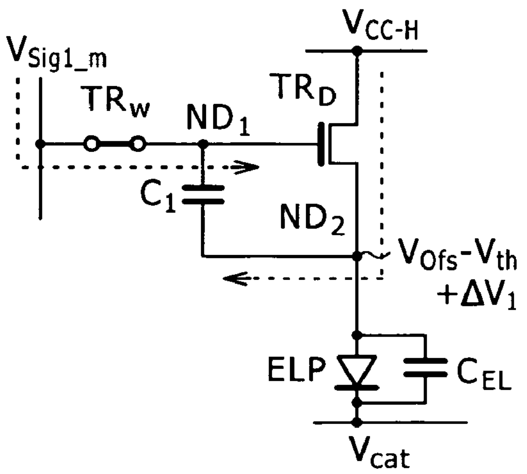

Thus, in the first writing process, a current flows through the driving transistor $TR_D$ when the first video signal $V_{Sig1\_m}$ is applied to the gate electrode of the driving transistor $TR_D$, and the potential of the other source/drain region of the driving transistor $TR_D$ changes (rises) on the basis of the value of the first video signal $V_{Sig1\_m}$ and the value of length of a period during which the first video signal $V_{Sig1\_m}$ is applied to the gate electrode of the driving transistor $TR_D$ (FIG. 6K). An amount of rise in potential (potential correction value) at the second node $ND_2$ will be denoted as $\Delta V_1$.

Figure 7:
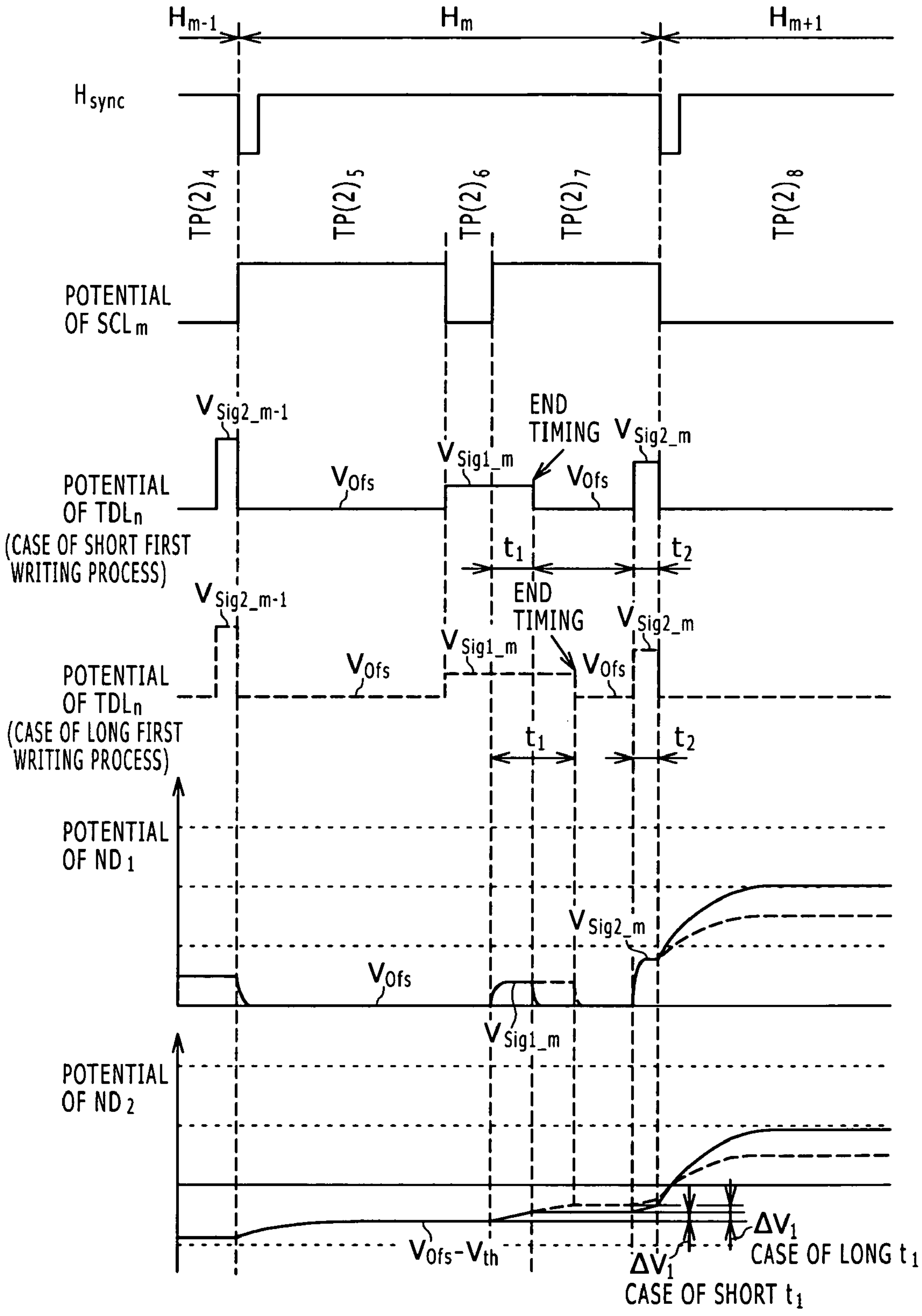
FIG. 7 is a schematic diagram of a timing chart of assistance in explaining operation when length of a period of a first writing process is changed.
Figure 8:
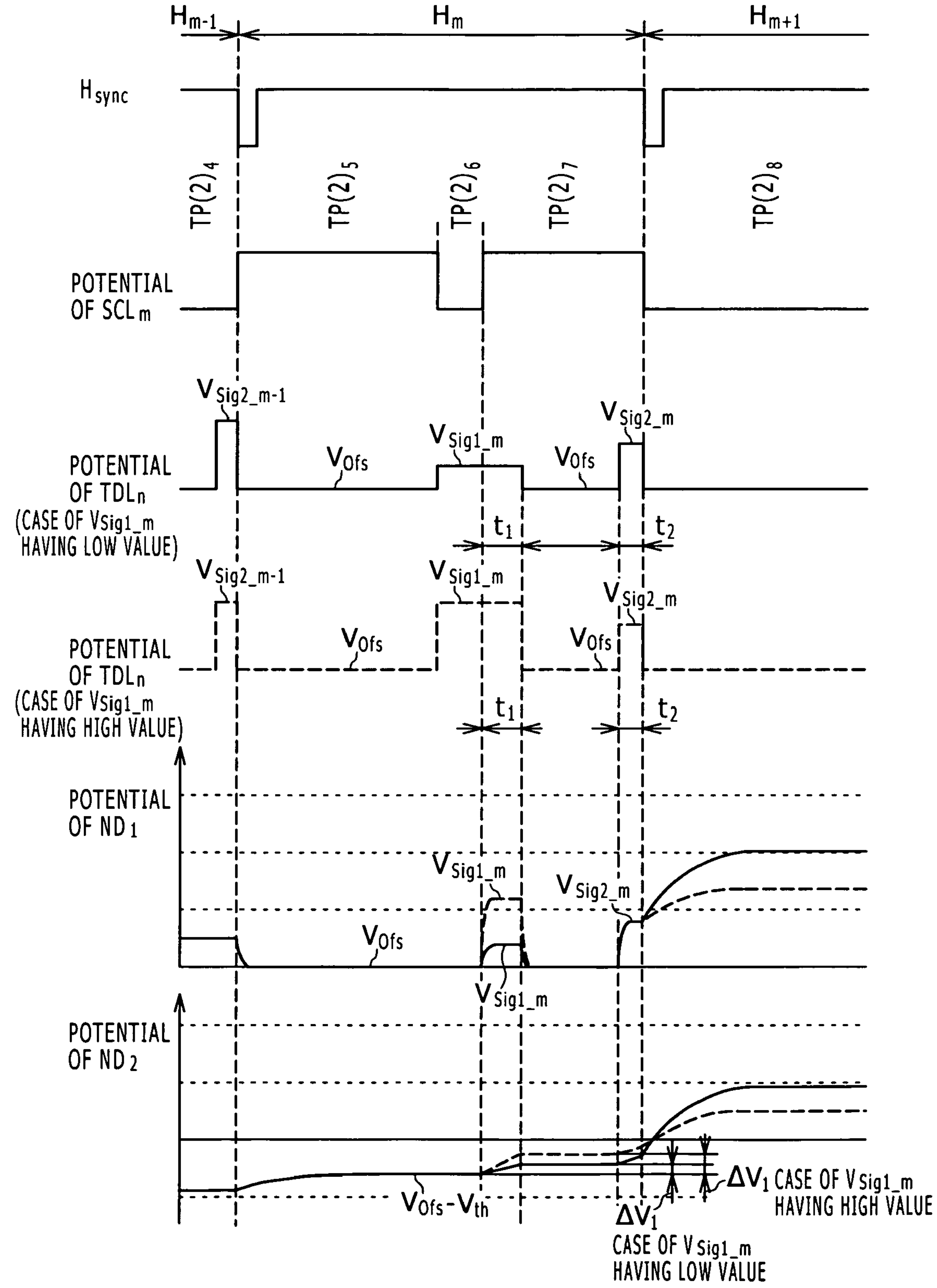
FIG. 8 is a schematic diagram of a timing chart of assistance in explaining operation when the value of a first video signal is changed.

Description will be made in the following of change in the potential correction value $\Delta V_1$ when the length of the period of the first writing process is changed and change in the potential correction value $\Delta V_1$ when the value of the first video signal $V_{Sig1\_m}$ is changed. FIG. 7 is a schematic diagram of a timing chart of assistance in explaining operation when the length "$t_1$" of the period of the first writing process is changed. FIG. 8 is a schematic diagram of a timing chart of assistance in explaining operation when the value of the first video signal $V_{Sig1\_m}$ is changed.

As shown in FIG. 7, the potential correction value $\Delta V_1$ is increased as the period during which the first video signal $V_{Sig1\_m}$ is applied to the gate electrode of the driving transistor $TR_D$ is lengthened by delaying the end timing of supply of the first video signal $V_{Sig1\_m}$ to the data line $DTL_n$ within [period-TP(2)$_7$]. Thus, the value of the potential correction value $\Delta V_1$ can be adjusted by changing the end timing of supply of the first video signal $V_{Sig1\_m}$ to the data line $DTL_n$ within [period-TP(2)$_7$].

In addition, as shown in FIG. 8, the potential correction value $\Delta V_1$ is increased as the value of the first video signal $V_{Sig1\_m}$ within [period-TP(2)$_7$] is increased. Thus, the value of the potential correction value $\Delta V_1$ can be adjusted also by changing the value of the first video signal $V_{Sig1\_m}$ within [period-TP(2)$_7$].

Thus, the potential of the other source/drain region of the driving transistor $TR_D$ changes (rises) as the value of the length "$t_1$" of the period during which the first writing process shown in FIG. 5 is performed is increased or as the value of the first video signal $V_{Sig1\_m}$ is increased. The potential of the second node $ND_2$ after the first writing process is $(V_{Ofs}-V_{th}+\Delta V_1)$.

Thereafter the supply of the first video signal $V_{Sig1\_m}$ to the data line $DTL_n$ is ended on the basis of the operation of the signal output circuit 102. Specifically, the reference voltage $V_{Ofs}$ is supplied to the data line $DTL_n$ in place of the first video signal $V_{Sig1\_m}$ on the basis of the operation of the signal switching section 102C in the signal output circuit 102.

Figure 6L:
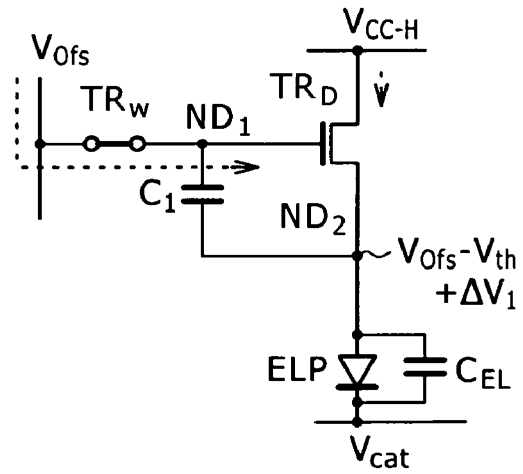

The reference voltage $V_{Ofs}$ is thereby applied to the gate electrode of the driving transistor $TR_D$. The gate-to-source voltage of the driving transistor $TR_D$ becomes lower than the threshold voltage $V_{th}$ of the driving transistor $TR_D$. The driving transistor $TR_D$ is thus set in a non-conducting state. The potential of the second node $ND_2$ retains the previous value (FIG. 6L).

Next, the second video signal $V_{Sig2\_m}$ is supplied to the data line $DTL_n$ on the basis of the operation of the signal output circuit 102. Incidentally, in the first embodiment, length "$t_2$" of a period from start timing of the supply of the second video signal $V_{Sig2\_m}$ to end timing of [period-TP(2)$_7$] is set to be a predetermined length determined in design.

Figure 6M:
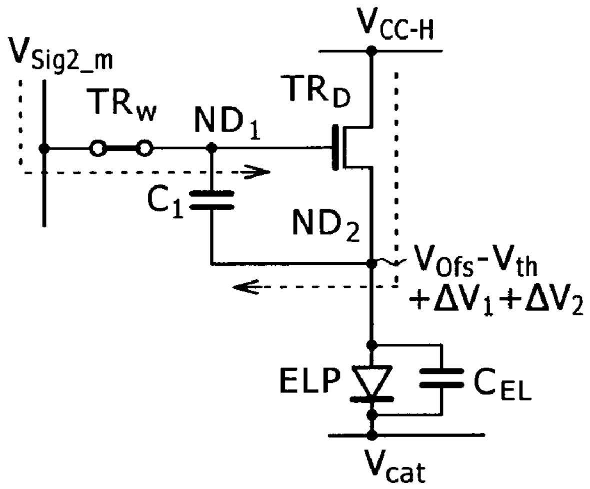

The second writing process is performed by applying the second video signal $V_{Sig2\_m}$ to the gate electrode of the driving transistor $TR_D$ until the end timing of [period-TP(2)$_7$] in a state of the driving voltage $V_{CC-H}$ being applied from the feeder line PS1 to one source/drain region of the driving transistor $TR_D$. As in the first writing process described above, a current flows through the driving transistor $TR_D$, and the potential of the other source/drain region of the driving transistor $TR_D$ changes (rises) (FIG. 6M). An amount of rise in potential at the second node $ND_2$ at this time will be denoted as $\Delta V_2$. As a result of the first writing process and the second writing process, a voltage $V_{Sig2\_m}-(V_{Ofs}-V_{th}+\Delta V_1+\Delta V_2)$ is retained in the capacitance section $C_1$.

Figure 6N:
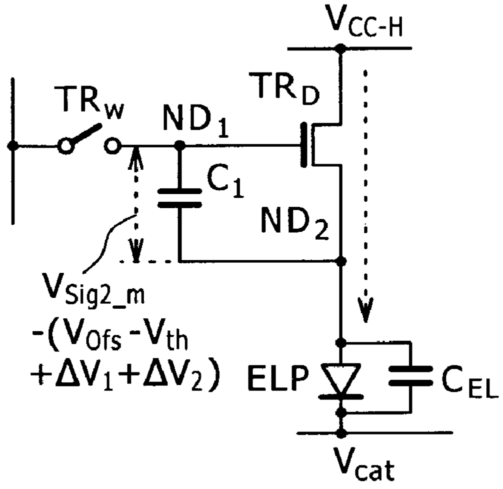
Figure 6O:
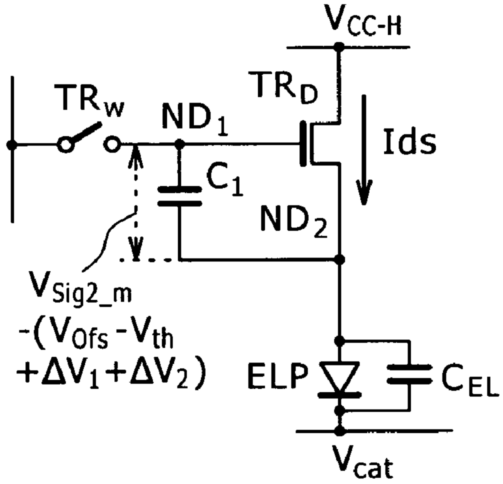

[period-TP(2)$_8$] (see FIG. 5 and FIGS. 6N and 6O)

In end timing of [period-TP(2)$_7$], the scanning signal from the scanning line SCL ends to set the writing transistor $TR_W$ in a non-conducting state. In this [period-TP(2)$_8$], the gate electrode of the driving transistor $TR_D$ and the data line $DTL_n$ are electrically disconnected from each other, and thus the gate electrode of the driving transistor $TR_D$ is set in a floating state. Because of the presence of the capacitance section $C_1$, a phenomenon similar to that of a so-called bootstrap circuit occurs at the gate electrode of the driving transistor $TR_D$, and thus the potential of the first node $ND_1$ also rises (FIG. 6N). Then, a current flows through the light emitting section ELP via the driving transistor $TR_D$ according to the value of the voltage retained in the capacitance section $C_1$, so that the light emitting section ELP emits light (FIG. 6O).

As described above, the display element 10 retains the voltage $V_{Sig2\_m}-(V_{Ofs}-V_{th}+\Delta V_1+\Delta V_2)$ in the capacitance section $C_1$ as a result of the writing processes. This voltage corresponds to the voltage $V_{gs}$ of the gate electrode of the driving transistor $TR_D$ with respect to the source region of the driving transistor $TR_D$. A drain current $I_{ds}$ given by the following Equation (5) thus flows through the light emitting section ELP via the driving transistor $TR_D$, so that the light emitting section ELP emits light.

$$I_{ds}=k\cdot\mu\cdot(V_{Sig2\_m}-V_{Ofs}-\Delta V_1-\Delta V_2)^2 \quad (5)$$

As is clear from this Equation (5), the value of the drain current $I_{ds}$ is increased as the value of the second video signal $V_{Sig2\_m}$ is increased, and is decreased as the value of the potential correction value $\Delta V_1$ is increased. The luminance of the light emitted by the light emitting section ELP is qualitatively proportional to the value of the drain current $I_{ds}$. In addition, the value of $\Delta V_2$ is determined according to the value of the second video signal $V_{Sig2\_m}$. Thus, the luminance of the light emitted by the light emitting section ELP can be essentially controlled on the basis of the value of the second video signal $V_{Sig2\_m}$ and the value of the potential correction value $\Delta V_1$.

The value of $\Delta V_1$ is adjusted by changing the end timing of supply of the first video signal $V_{Sig1\_m}$ to the data line $DTL_n$ within [period-TP(2)$_7$] or changing the value of the first video signal $V_{Sig1\_m}$, so that the luminance of the light emitting section ELP can be controlled.

As described above, the light emitting section ELP can be made to emit light at different gradations also by changing the value of $\Delta V_1$ independently of the value of the second video signal $V_{Sig2}$. The above-described operation can be performed when any of the second video signals $V_{Sig2[1]}$ and $V_{Sig2[P]}$ is applied. It is therefore possible to perform gradation control for a number of gradations which number exceeds the number of steps of the second video signal $V_{Sig2}$.

The gradation control for the light emitting section ELP will be described in more detail with reference to FIG. 9, FIG. 10, FIG. 11, and FIG. 12.

Figure 9:
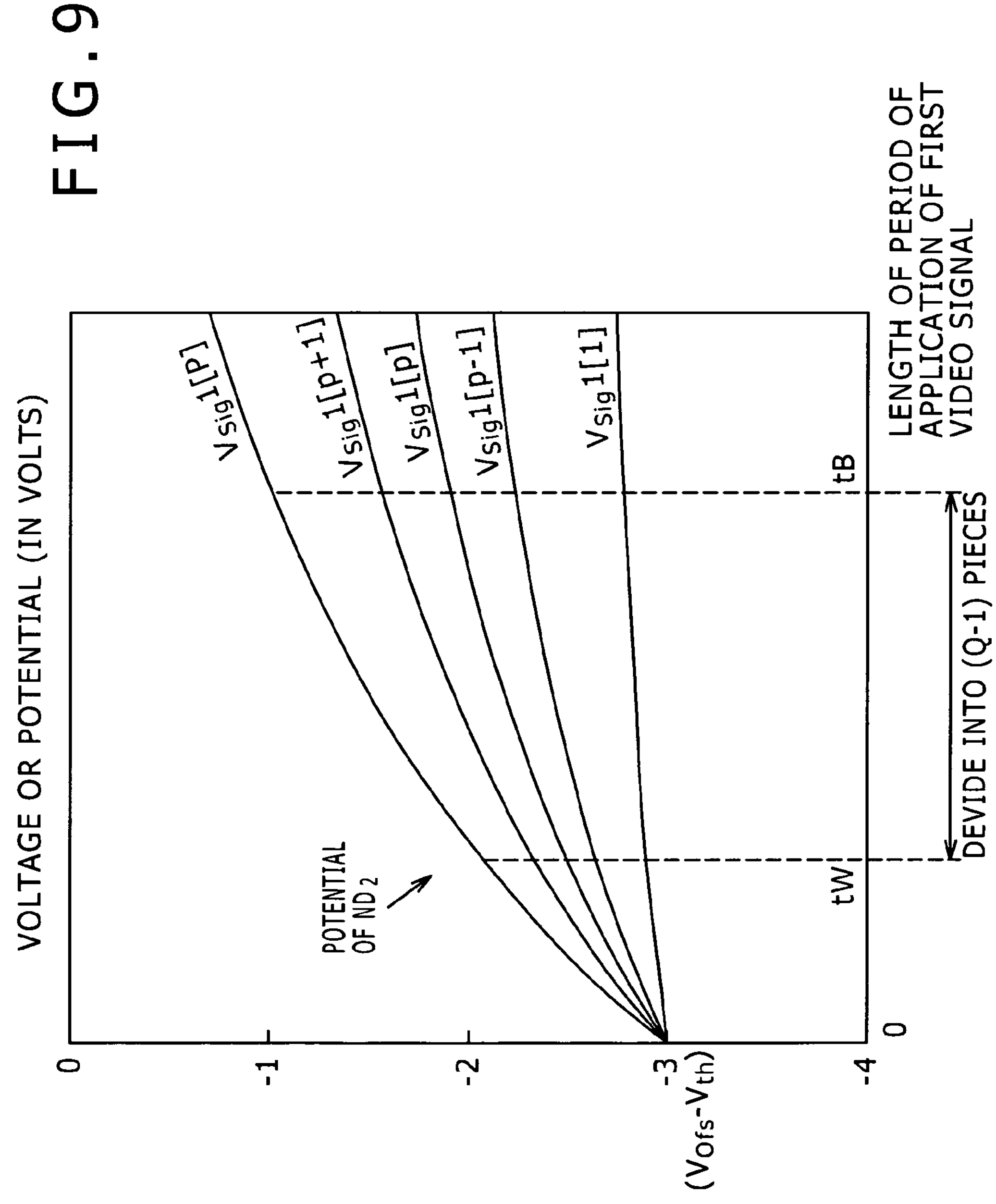
FIG. 9 is a schematic graph of assistance in explaining changes in potential of a second node when the value of the first video signal and the value of the length of a period during which the first video signal is applied to the gate electrode of a driving transistor are changed within [period-TP$(\mathbf{2})_7$] shown in FIG. 5.

FIG. 9 is a schematic graph of assistance in explaining changes in potential of the second node $ND_2$ when the value of the first video signal $V_{Sig1}$ and the value of the length of the period during which the first video signal $V_{Sig1}$ is applied to the gate electrode of the driving transistor $TR_D$ are changed within [period-TP(2)$_7$] shown in FIG. 5. Specifically, FIG. 9 schematically shows states when first video signals $V_{Sig1[1]}$, $V_{Sig1[p-1]}$ $V_{Sig1[p]}$, $V_{Sig1[p+1]}$, and $V_{Sig1[p]}$ are applied.

When the first video signal $V_{Sig1}$ is applied to the gate electrode of the driving transistor $TR_D$ in [period-TP(2)$_7$], the voltage of the first node $ND_1$ is $V_{Sig1}$, and is constant. On the other hand, the potential of the second node $ND_2$ is initially $(V_{Ofs}-V_{th})$, which is −3 volts in the first embodiment.

When $V_{Sig1[P]}$ (8 volts), for example, is applied as the first video signal $V_{Sig1}$ in [period-TP (2)$_7$], the voltage $V_{gs}$ of the gate electrode of the driving transistor $TR_D$ with respect to the source region of the driving transistor $TR_D$ is 11 volts immediately after the first video signal $V_{Sig1[P]}$ is applied. Thus, the value of the drain current $I_{ds}$ flowing through the driving transistor $TR_D$ immediately after the first video signal $V_{Sig1[P]}$ is applied to the gate electrode of the driving transistor $TR_D$ is obtained with $V_{gs}$ set at 11 volts in Equation (1) described above.

Because a charge produced by the above-described drain current $I_{ds}$ flows into the second node $ND_2$, the potential of the second node $ND_2$ rises. On the other hand, the value of the voltage $V_{gs}$ of the gate electrode of the driving transistor $TR_D$ with respect to the source region of the driving transistor $TR_D$ decreases with the rise in potential of the second node $ND_2$. Thus, as the period during which the first video signal $V_{Sig1[P]}$ is applied to the gate electrode of the driving transistor $TR_D$ is lengthened, the value of the drain current $I_{ds}$ flowing through the driving transistor $TR_D$ is decreased, and the potential of the second node $ND_2$ rises more gently. As a result, as shown in FIG. 9, the potential of the second node $ND_2$ when the first video signal $V_{Sig1[P]}$ is applied changes in the form of an upwardly convex curve.

The potential of the second node $ND_2$ basically exhibits similar behavior to that described above when first video signals $V_{Sig1}$ of values other than $V_{Sig1[P]}$ are applied. However, as the value of the first video signal $V_{Sig1}$ becomes relatively small, the voltage $V_{gs}$ of the gate electrode of the driving transistor $TR_D$ with respect to the source region of the driving transistor $TR_D$ immediately after the first video signal $V_{Sig1}$ is applied is decreased, and the potential of the second node $ND_2$ rises more gently. As a result, a line of the potential of the second node $ND_2$ when $V_{Sig1[p+]}$ is applied is situated over a line of the potential of the second node $ND_2$ when $V_{Sig1[p]}$ is applied, and a line of the potential of the second node $ND_2$ when $V_{Sig1[p-1]}$ is applied is situated under the line of the potential of the second node $ND_2$ when $V_{Sig1[p]}$ is applied. Suppose in this case that values of a maximum length and a minimum length of the period during which the first video signal $V_{Sig1}$ is applied to the gate electrode of the driving transistor $TR_D$, which values are set in design of the display device, are a certain value "$t_B$" and a certain value "$t_W$."

Figure 10:
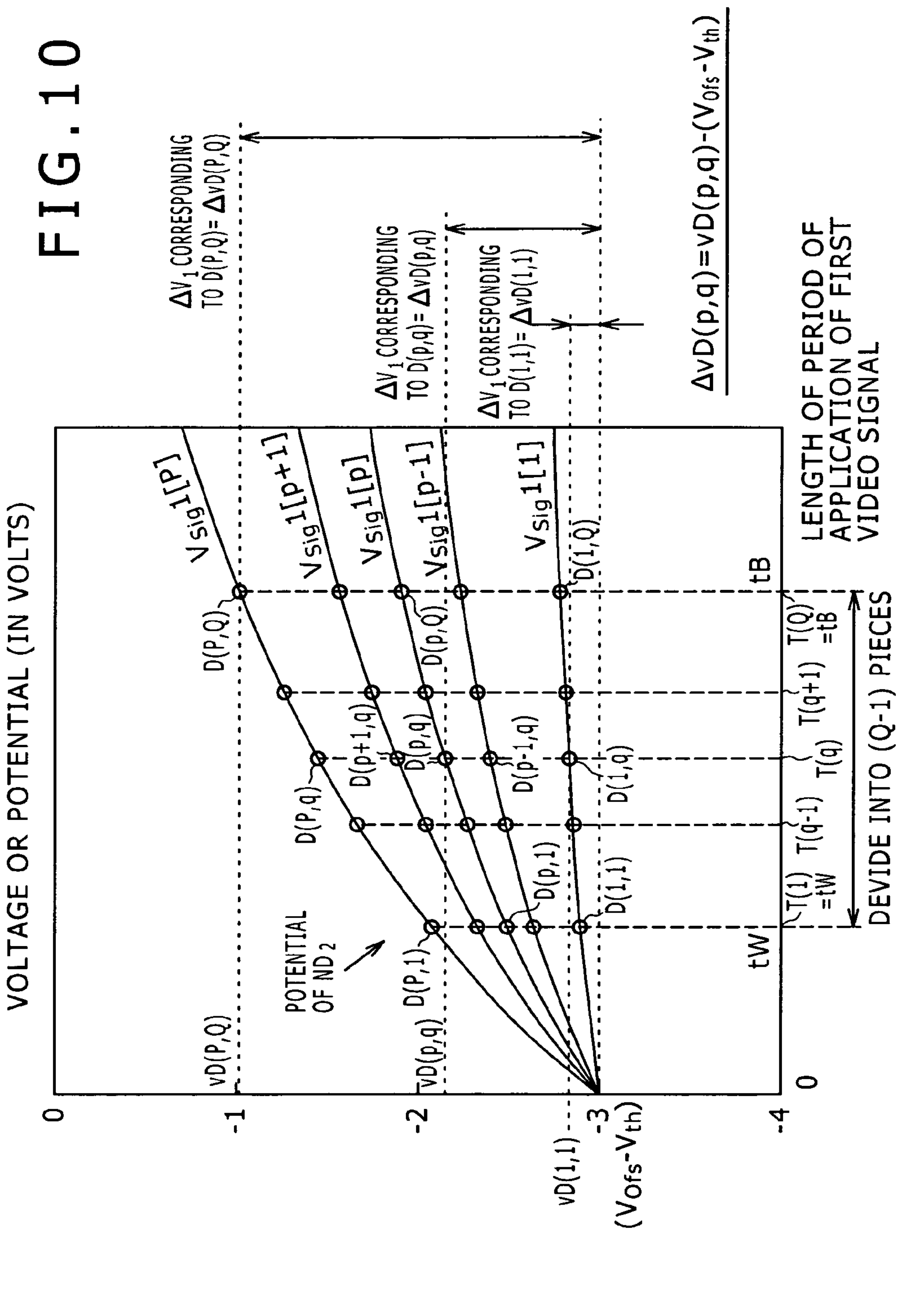
FIG. 10 is a schematic graph of assistance in explaining a range of adjustment of potential of the second node when a second writing process is performed.

FIG. 10 is a schematic graph of assistance in explaining a range of adjustment of the potential of the second node $ND_2$ when the second writing process is performed. In the first embodiment, an interval between "$t_B$" and "$t_W$" are divided into (Q−1) pieces. While equal division is made in the first embodiment, the division does not necessarily need to be equal division. For example, the interval can be divided so as to satisfy a condition for eliminating nonlinearity in gradation control.

As shown in FIG. 10, the length of the period during which the first video signal $V_{Sig1}$ is applied is discreted into Q values from T(1) to T(Q). Incidentally, T(1)="$t_W$," and T(Q)="$t_B$." A point of intersection of the line of the potential of the second node $ND_2$ when the first video signal is $V_{Sig1[p]}$ and the length T(q) (where q=1, 2, . . . , Q) of the period during which the first video signal $V_{Sig1[p]}$ is applied will be denoted as D(p, q). The potential of the second node $ND_2$ which potential corresponds to D(p, q) will be denoted as vD(p, q). In other words, D(p, q)=(T(q), vD(p, q)).

When an expression $\Delta vD(p, q)=vD(p, q)-(V_{Ofs}-V_{th})$ is used, the potential correction value $\Delta V_1$ corresponding to D(p, q) is ΔvD(p, q). As is clear from FIG. 10, a maximum value of ΔvD(p, q) is ΔvD(P, Q) corresponding to D(P, Q) among the points D(1, 1) to D(P, Q), and a minimum value of ΔvD(p, q) is ΔvD(1, 1) corresponding to D(1, 1). ΔvD(p, q) corresponding to D(p, q) changes according to a combination of p and q. In other words, the potential correction value $\Delta V_1$ can be selected from P×Q values from ΔvD(1, 1) to ΔvD(P, Q) by selecting a combination of p and q as appropriate. FIG. 11 is a table of assistance in explaining relation between the values of the potential correction value $\Delta V_1$, the kinds of first video signal $V_{Sig1}$, and the lengths of the period during which the first writing process is performed.

Incidentally, in the first embodiment, the above-described value "$t_B$" is selected such that a difference between a minimum value (2 volts) of the second video signal $V_{Sig2}$ and vD(P, Q) exceeds the threshold voltage $V_{th}$ of the driving transistor $TR_D$.

When the first video signal $V_{Sig1}$ is $V_{Sig1[p]}$, the length of the period during which the first writing process is performed is T(q), and the second video signal $V_{Sig2}$ is $V_{Sig2[p']}$ (where p'=1, 2, . . . , P), the drain current flowing in [period-TP(2)$_8$] will be denoted as $I_{ds}$(p, q, p'). At this time, because the potential correction value $\Delta V_1$ is equal to ΔvD(p, q), $I_{ds}$(p, q, p') is expressed by the following Equation (5').

$$I_{ds}(p,q,p')=k\cdot\mu\cdot(V_{Sig2[p']\_m}-V_{Ofs}-\Delta vD(p,q)-\Delta V_2)^2 \quad (5')$$

As is clear from Equation (5'), $I_{ds}$(p, q, p') becomes a minimum when the value of $V_{Sig2[p']\_m}$ is a minimum and the value of ΔvD(p, q) is a maximum. The value of the video signal $V_{Sig2[p']\_m}$ becomes the minimum when p'=1, and the value of ΔvD(p, q) becomes the maximum when p=P and q=Q. That is, $I_{ds}$(P, Q, 1) is the minimum. On the other hand, $I_{ds}$(p, q, p') becomes a maximum when the value of the second video signal $V_{Sig2[p']\_m}$ is a maximum and the value of ΔvD(p, q) is a minimum. The value of the video signal $V_{Sig2[p']\_m}$ becomes the maximum when p'=P, and the value of ΔvD(p, q) becomes the minimum when p=1 and q=1. That is, $I_{ds}$(1, 1, P) is the maximum.

$I_{ds}$(p, q, p') can assume P×Q×P values from $I_{ds}$(1, 1, 1) to $I_{ds}$(P, Q, P). As described above, the value of $I_{ds}$(P, Q, 1) is the minimum, and the value of $I_{ds}$(1, 1, P) is the maximum.

The storage device 102F shown in FIG. 1 and FIG. 3 stores luminance level index data based on the values of the drain current $I_{ds}$(p, q, p') described above. FIG. 12 is a table of assistance in explaining the data stored in the storage device 102F.

The storage device 102F stores the data composed of luminance level indexes w(1, 1, 1) to w(P, Q, P).

The luminance level indexes are obtained by converting the values of the drain current $I_{ds}$(p, q, p') described above so that a minimum value of the luminance level indexes is 0 and a maximum value of the luminance level indexes is $(2^u-1)$, for example. That is, the numerical values are converted so that w(P, Q, 1) corresponding to $I_{ds}$(P, Q, 1) whose current value is the minimum is 0 and w(1, 1, P) corresponding to $I_{ds}$(1, 1, P) whose current value is the maximum is $(2^u-1)$. Specifically, the values are converted on the basis of an equation $w(p, q, p')=(2^u-1)\times(I_{ds}(p, q, p')-I_{ds}(P, Q, 1))/(I_{ds}(1, 1, P)-I_{ds}(P, Q, 1))$. Incidentally, while the above value of "u" can be set appropriately according to the design of the display device, suppose in the following description that u=10. Thus, $0\leqq w(p, q, p')\leqq 1023$.

When an input signal discreted into eight bits is input to the selector 102D shown in FIG. 3, the selector 102D refers to the data in the storage device 102F to select a luminance level index w(p, q, p') closest to or equal to four times the value of the input signal. The selector 102D then supplies a selection signal to the video signal generating section 102A so that the first video signal $V_{Sig1[p]}$ and the second video signal $V_{Sig2[p']}$ corresponding to the index w(p, q, p') are generated sequentially. In a similar manner, the selector 102D appropriately selects a pulse generated by the pulse generating circuit 102E so that the first video signal $V_{Sig1[p]}$ is applied to the gate electrode during the period length T(q). The selector 102D supplies the pulse as a switching signal to the signal switching section 102C. In this example, a constitution suffices in which the pulse generating circuit 102E shown in FIG. 3 generates Q kinds of pulses from the start timing of the horizontal synchronizing signal $H_{sync}$ which pulses have different falling edge timing, for example, and the selector 102D appropriately selects a pulse according to the value of the input signal and supplies the pulse as a switching signal to the signal switching section 102C.

Details of gradation control have been described above. Incidentally, while the above description has been made supposing that the lengths T(1) to T(Q) in FIG. 10 are common irrespective of the value of the first video signal $V_{Sig1}$, the lengths T(1) to T(Q) are not limited to this. A condition for dividing the interval between "$t_W$" and "$t_B$" in FIG. 10 into (Q−1) pieces can be changed according to the value of the first video signal $V_{Sig1}$.

Details of operation of the (n, m)th display element 10 in the driving method according to the first embodiment will next be described with reference to FIG. 5 and FIGS. 6A to 6O.

[period-TP(2)$_{-1}$] (see FIG. 5 and FIG. 6A)

This [period-TP(2)$_{-1}$] is for example a period during which operation in a previous display frame is performed, and during which the (n, m)th display element 10 is in an emission state after completion of various previous processes. That is, a drain current $I_{ds}$' based on Equation (5) to be described later is flowing through the light emitting section ELP in the display element 10 forming the (n, m)th sub-pixel, and the luminance of the display element 10 forming the (n, m)th sub-pixel has a value corresponding to the drain current $I_{ds}'$. In this case, the writing transistor $TR_W$ is in a non-conducting state, and the driving transistor $TR_D$ is in a conducting state. The emission state of the (n, m)th display element 10 is continued until immediately before a start of a horizontal scanning period of display elements 10 arranged in an (m+m')th row.

As described above, the data line $DTL_n$ is supplied with the reference voltage $V_{Ofs}$, the first video signal $V_{Sig1}$, and the second video signal $V_{Sig2}$ so as to correspond to each horizontal scanning period. However, because the writing transistor $TR_W$ is in a non-conducting state, even when the potential (voltage) of the data line $DTL_n$ changes in [period-TP(2)$_{-1}$], the potentials of the first node $ND_1$ and the second node $ND_2$ do not change (potential changes due to capacitive coupling of a parasitic capacitance or the like can occur in practice, but are usually negligible). The same is true for [period-TP(2)$_0$] to be described later.

Periods shown as [period-TP(2)$_0$] to [period-TP(2)$_6$] in FIG. 5 are operation periods from an end of the emission state after the completion of the various previous processes to timing immediately before [period-TP(2)$_7$] in which next writing processes are performed. The (n, m)th display element 10 is in a non-conducting state in principle in [period-TP(2)$_0$] to [period-TP(2)$_7$]. As shown in FIG. 5, [period-TP(2)$_5$], [period-TP(2)$_6$], and [period-TP(2)$_7$] are included in the mth horizontal scanning period $H_m$.

An outline of operation will be described. In the first embodiment, in [period-TP(2)$_1$], an initializing voltage $V_{CC-L}$ such that a difference between the initializing voltage $V_{CC-L}$, and the reference voltage $V_{Ofs}$ exceeds the threshold voltage $V_{th}$ of the driving transistor $TR_D$ is applied to one source/drain region of the driving transistor $TR_D$, and the reference voltage $V_{Ofs}$ is applied to the gate electrode of the driving transistor $TR_D$, whereby the potential of the gate electrode of the driving transistor $TR_D$ and the potential of the other source/drain region of the driving transistor $TR_D$ are initialized.

In [period-TP(2)$_3$] and [period-TP(2)$_5$], a driving voltage $V_{CC-H}$ is applied to one source/drain region of the driving transistor $TR_D$ in a state of the reference voltage $V_{Ofs}$ being applied from the data line $DTL_n$ to the gate electrode of the driving transistor $TR_D$, whereby a threshold voltage cancelling process of bringing the potential of the other source/drain region of the driving transistor $TR_D$ closer to a potential obtained by subtracting the threshold voltage $V_{th}$ of the driving transistor $TR_D$ from the reference voltage $V_{Ofs}$ is performed.

In the first embodiment, description is made supposing that the threshold voltage cancelling process is performed in a plurality of horizontal scanning periods, or more specifically an (m−1)th horizontal scanning period $H_{m-1}$ and the mth horizontal scanning period $H_m$. However, the threshold voltage cancelling process is not limited to this. Though depending on specifications of the display device, the threshold voltage cancelling process may be performed in one horizontal scanning period. Alternatively, the threshold voltage cancelling process may be performed in three or more horizontal scanning periods.

In FIG. 5, [period-TP(2)$_1$] coincides with a reference voltage period in an (m−2)th horizontal scanning period $H_{m-2}$, [period-TP(2)$_3$] coincides with a reference voltage period in the (m−1)th horizontal scanning period $H_{m-1}$, and [period-TP(2)$_5$] coincides with a reference voltage period in the mth horizontal scanning period $H_m$.

Details of operation in each of the periods [period-TP(2)$_0$] to [period-TP(2)$_8$] will next be described with reference to FIG. 5 and the like.

[period-TP(2)$_0$] (see FIG. 5 and FIG. 6B)

In this [period-TP(2)$_0$], operation in a previous display frame and a present display frame, for example, is performed. That is, this [period-TP(2)$_0$] is a period from the start timing of an (m+m')th horizontal scanning period $H_{m+m'}$ in the previous display frame to the end timing of an (m−3)th horizontal scanning period $H_{m-3}$ in the present display frame. In [period-TP(2)$_0$], the (n, myth display element 10 is in a non-conducting state in principle. In the start timing of [period-TP(2)$_0$], the voltage supplied from the power supply section 100 to the feeder line PS1$_m$ is changed from the driving voltage $V_{CC-H}$ to the initializing voltage $V_{CC-L}$. As a result, the potential of the second node $ND_2$ is lowered to $V_{cc-L}$, a reverse-direction voltage is applied between the anode electrode and the cathode electrode of the light emitting section ELP, and the light emitting section ELP is set in a non-emission state. In addition, the potential of the first node $ND_1$ (gate electrode of the driving transistor $TR_D$) in a floating state is lowered so as to follow the decrease in potential of the second node $ND_2$.

[Period-TP(2)$_1$] (see FIG. 5 and FIG. 6C)

Then, the (m−2)th horizontal scanning period $H_{m-2}$ in the present display frame begins. In this [period-TP(2)$_1$], the scanning line $SCL_m$ is set to a high level to set the writing transistor $TR_W$ of the display element 10 in a conducting state. The voltage supplied from the signal output circuit 102 to the data line $DTL_n$ is the reference voltage $V_{Ofs}$. As a result, the potential of the first node $ND_1$ becomes $V_{Ofs}$ (0 volts). The initializing voltage $V_{CC-L}$ is applied from the feeder line PS1$_m$ to the second node $ND_2$ on the basis of the operation of the power supply section 100. The potential of the second node $ND_2$ is therefore maintained at $V_{CC-L}$ (−10 volts).

Because a potential difference between the first node $ND_1$ and the second node $ND_2$ is 10 volts, and the threshold voltage $V_{th}$ of the driving transistor $TR_D$ is 3 volts, the driving transistor $TR_D$ is in a conducting state. Incidentally, a potential difference between the second node $ND_2$ and the cathode electrode provided to the light emitting section ELP is −10 volts, which does not exceed the threshold voltage $V_{th-EL}$ of the light emitting section ELP. Thereby the potential of the first node $ND_1$ and the potential of the second node $ND_2$ are initialized.

[period-TP(2)$_2$] (see FIG. 5 and FIG. 6D)

In this [period-TP(2)$_2$], the scanning line $SCL_m$ is set to a low level. The writing transistor $TR_W$ of the display element 10 is set in a non-conducting state. The potentials of the first node $ND_1$ and the second node $ND_2$ basically maintain the previous states.

[period-TP(2)$_3$] (see FIG. 5 and FIGS. 6E and 6F)

In this [period-TP(2)$_3$], a first threshold voltage cancelling process is performed. The scanning line $SCL_m$ is set to a high level to set the writing transistor $TR_W$ of the display element 10 in a conducting state. The voltage supplied from the signal output circuit 102 to the data line $DTL_n$ is the reference voltage $V_{Ofs}$. The potential of the first node $ND_1$ is $V_{Ofs}$ (0 volts).

Next, the voltage supplied from the power supply section 100 to the feeder line PS1$_m$ is changed from the initializing voltage $V_{CC-L}$ to the driving voltage $V_{CC-H}$. As a result, while the potential of the first node $ND_1$ does not change ($V_{Ofs}$=0 volts is retained), the potential of the second node $ND_2$ changes toward the potential obtained by subtracting the threshold voltage $V_{th}$ of the driving transistor $TR_D$ from the reference voltage $V_{Ofs}$. That is, the potential of the second node $ND_2$ rises.

When this [period-TP(2)$_3$] is sufficiently long, the potential difference between the gate electrode of the driving transistor $TR_D$ and the other source/drain region of the driving transistor $TR_D$ reaches $V_{th}$, so that the driving transistor $TR_D$ is set in a non-conducting state. That is, the potential of the second node $ND_2$ approaches $(V_{Ofs}-V_{th})$, and eventually becomes $(V_{Ofs}-V_{th})$. However, the length of [period-TP(2)$_3$] in the example shown in FIG. 5 is not enough to change the potential of the second node $ND_2$ sufficiently. The potential of the second node $ND_2$ in the end timing of [period-TP(2)$_3$] reaches a certain potential $V_1$ satisfying a relation $V_{CC-L}<V_1<(V_{Ofs}-V_{th})$. [period-TP(2)$_4$] (see FIG. 5 and FIG. 6G)

In this [period-TP(2)$_4$], the scanning line $SCL_m$ is set to a low level to set the writing transistor $TR_W$ of the display element 10 in a non-conducting state. As a result, the first node $ND_1$ is set in a floating state.

Because the driving voltage $V_{CC-H}$ is applied from the power supply section 100 to one source/drain region of the driving transistor $TR_D$, the potential of the second node $ND_2$ rises from the potential $V_1$ to a certain potential $V_2$. Meanwhile, because the gate electrode of the driving transistor $TR_D$ is in a floating state, and the capacitance section $C_1$ is present, bootstrap operation occurs at the gate electrode of the driving transistor $TR_D$. Thus, the potential of the first node $ND_1$ rises so as to follow the change in potential of the second node $ND_2$.

As a precondition for operation in next [period-TP(2)$_5$], the potential of the second node $ND_2$ needs to be lower than $(V_{Ofs}-V_{th})$ in the start timing of [period-TP(2)$_5$]. The length of [period-TP(2)$_4$] is set so as to satisfy a condition $V_2<(V_{Ofs}-V_{th})$ in design of the display device.

[period-TP(2)$_5$] (see FIG. 5, FIG. 6H, and FIG. 6I)

In this [period-TP(2)$_5$], a second threshold voltage cancelling process is performed. The writing transistor $TR_W$ of the display element 10 is set in a conducting state on the basis of a scanning signal from the scanning line $SCL_m$. The voltage supplied from the signal output circuit 102 to the data line $DTL_n$ is the reference voltage $V_{Ofs}$. The potential of the first node $ND_1$ changes from the potential raised by the bootstrap operation to $V_{Ofs}$ (0 volts) again.

Suppose in this case that the value of the capacitance section $C_1$ is a value $c_1$, and that the value of the capacitance $C_{EL}$ of the light emitting section ELP is a value $c_{EL}$. Then, suppose that the value of a parasitic capacitance between the gate electrode and the other source/drain region of the driving transistor $TR_D$ is $c_{gs}$. When a capacitance value between the first node $ND_1$ and the second node $ND_2$ is represented by a reference $c_A$, $c_A=c_1+c_{gs}$. When a capacitance value between the second node $ND_2$ and the second feeder line PS2 is represented by a reference $c_B$, $c_B=c_{EL}$. Incidentally, an additional capacitance section may be connected to both terminals of the light emitting section ELP so as to be parallel with the light emitting section ELP. In this case, the capacitance value of the additional capacitance section is further added to $c_B$.

When the potential of the first node $ND_1$ changes, a potential difference between the first node $ND_1$ and the second node $ND_2$ also changes. That is, a charge based on an amount of change in potential of the first node $ND_1$ is distributed according to the capacitance value between the first node $ND_1$ and the second node $ND_2$ and the capacitance value between the second node $ND_2$ and the second feeder line PS2. However, when the value $c_B$ $(=c_{EL})$ is sufficiently large as compared with the value $c_A$ $(=c_1+c_{gs})$, a change in potential of the second node $ND_2$ is small. The value $c_{EL}$ of the capacitance $C_{EL}$ of the light emitting section ELP is generally larger than the value $c_1$ of the capacitance section $C_1$ and the value $c_{gs}$ of the parasitic capacitance of the driving transistor $TR_D$. Description in the following will be made without considering the change in potential of the second node $ND_2$ which change is caused by the change in potential of the first node $ND_1$. Incidentally, in the driving timing chart of FIG. 5, the change in potential of the second node $ND_2$ which change is caused by the change in potential of the first node $ND_1$ is not shown.

Because the driving voltage $V_{CC-H}$ is applied from the power supply section 100 to one source/drain region of the driving transistor $TR_D$, the potential of the second node $ND_2$ changes to the potential obtained by subtracting the threshold voltage $V_{th}$ of the driving transistor $TR_D$ from the reference voltage $V_{Ofs}$. That is, the potential of the second node $ND_2$ rises from the potential $V_2$, and changes to the potential obtained by subtracting the threshold voltage $V_{th}$ of the driving transistor $TR_D$ from the reference voltage $V_{Ofs}$. Then, when the potential difference between the gate electrode of the driving transistor. $TR_D$ and the other source/drain region of the driving transistor $TR_D$ reaches $V_{th}$, the driving transistor $TR_D$ is set in a non-conducting state. In this state, the potential of the second node $ND_2$ is substantially $(V_{Ofs}\ V_{th})$. In this case, when the following Equation (2) is ensured, or when the potential is selected and determined so as to satisfy Equation (2), the light emitting section ELP does not emit light.

$$(V_{Ofs}-V_{th})<(V_{th\text{-}EL}+V_{Cat}) \tag{2}$$

In this [period-TP(2)$_5$], the potential of the second node $ND_2$ eventually becomes $(V_{Ofs}-V_{th})$. That is, the potential of the second node $ND_2$ is determined depending on only the threshold voltage $V_{th}$ of the driving transistor $TR_D$ and the reference voltage $V_{Ofs}$. The potential of the second node $ND_2$ is independent of the threshold voltage $V_{th\text{-}EL}$ of the light emitting section ELP. In the end timing of [period-TP(2)$_5$], the writing transistor $TR_W$ is changed from the conducting state to a non-conducting state on the basis of the scanning signal from the scanning line $SCL_m$.

[period-TP(2)$_6$] (see FIG. 5 and FIG. 6J)

The non-conducting state of the writing transistor $TR_W$ is maintained during this period. The reference voltage period ends, and a first video signal $V_{Sig1\_m}$ is supplied to the data line $DTL_n$. Assuming that the driving transistor $TR_D$ has reached a non-conducting state in [period-TP(2)$_5$], the potentials of the first node $ND_1$ and the second node $ND_2$ do not change essentially. Incidentally, when the driving transistor $TR_D$ has not reached a non-conducting state in the threshold voltage cancelling process performed in [period-TP(2)$_5$], bootstrap operation occurs in [period-TP(2)$_6$], and the potentials of the first node $ND_1$ and the second node $ND_2$ rise somewhat.

[period-TP(2)$_7$] (see FIG. 5 and FIGS. 6K to 6M)

Within this [period-TP(2)$_7$], the first writing process and the second writing process described above are performed. As shown in FIG. 5, the potential of the second node $ND_2$ changes in the display element 10 in [period-TP(2)$_7$]. Amounts of rise in this potential ($\Delta V_1$ and $\Delta V_2$ shown in FIG. 5) are as described above, and thus description thereof will be omitted.

Letting $V_g$ be the potential of the gate electrode of the driving transistor $TR_D$ (first node $ND_1$), and letting $V_s$ be the potential of the other source/drain region of the driving transistor $TR_D$ (second node $ND_2$), the value of $V_g$ and the value of $V_s$ are as follows when the above-described rise in potential of the second node $ND_2$ is not considered. A potential difference between the first node $ND_1$ and the second node $ND_2$, that is, a potential difference $V_{gs}$ between the gate electrode of the driving transistor $TR_D$ and the other source/drain region acting as the source region of the driving transistor $TR_D$ can be expressed by the following Equation (3).

$$V_g = V_{Sig2\_m}$$

$$V_s \approx V_{Ofs} - V_{th}$$

$$V_{gs} \approx V_{Sig2\_m} - (V_{Ofs} - V_{th}) \quad (3)$$

That is, when the above-described rise in potential of the second node $ND_2$ is not considered, the potential difference $V_{gs}$ obtained in the writing process for the driving transistor $TR_D$ depends on only the second video signal $V_{Sig2\_m}$, the threshold voltage $V_{th}$ of the driving transistor $TR_D$, and the reference voltage $V_{Ofs}$. The potential difference $V_{gs}$ is independent of the threshold voltage $V_{th\text{-}EL}$ of the light emitting section ELP.

In the above-described driving method, the first video signal $V_{Sig1}$ and the second video signal $V_{Sig2}$ are applied to the gate electrode of the driving transistor $TR_D$ in a state of the driving voltage $V_{CC\text{-}H}$ being applied from the power supply section 100 to one source/drain region of the driving transistor $TR_D$. Thus, as shown in FIG. 5, the potential of the second node $ND_2$ rises by $\Delta V_1$ in the first writing process, and rises by $\Delta V_2$ in the second writing process. In this case, the potential difference $V_{gs}$ between the gate electrode of the driving transistor $TR_D$ and the other source/drain region acting as the source region of the driving transistor $TR_D$ is modified as in the following Equation (4) from Equation (3).

$$V_{gs} \approx V_{Sig2\_m} - (V_{Ofs} - V_{th}) - \Delta V_1 - \Delta V_2 \quad (4)$$

In addition, upper limits of the length "$t_1$" of the period during which the first writing process is performed and the length "$t_2$" of the period during which the second writing process is performed are determined such that the potential ($V_{Ofs} - V_{th} + \Delta V_1 + \Delta V_2$) in the other source/drain region of the driving transistor $TR_D$ satisfies the following Equation (2'). The light emitting section ELP does not emit light in [period-TP(2)$_7$].

$$(V_{Ofs} - V_{th} + \Delta V_1 + \Delta V_2) < (V_{th\text{-}EL} + V_{Cat}) \quad (2')$$

[period-TP(2)$_8$] (see FIG. 5 and FIGS. 6N and 6O)

The state of the driving voltage $V_{CC\text{-}H}$ being applied from the power supply section 100 to one source/drain region of the driving transistor $TR_D$ is maintained. In the display element 10, the capacitance section $C_1$ retains a voltage based on the second video signal $V_{Sig2\_m}$, the reference voltage $V_{Ofs}$, the threshold voltage $V_{th}$, the potential correction value $\Delta V_1$ and the like as a result of the writing processes. Because the scanning signal from the scanning line SCL has ended, the writing transistor $TR_W$ is in a non-conducting state. Thus, the gate electrode of the driving transistor $TR_D$ is set in a floating state. Thereby a current corresponding to the value of the voltage retained in the capacitance section $C_1$ as a result of the writing processes flows through the light emitting section ELP via the driving transistor $TR_D$, so that the light emitting section ELP emits light.

The operation of the display element 10 will be described more concretely. The state of the driving voltage $V_{CC\text{-}H}$ being applied from the power supply section 100 to one source/drain region of the driving transistor $TR_D$ is maintained, and the first node $ND_1$ is electrically disconnected from the data line $DTL_n$. Thus, the potential of the second node $ND_2$ rises as a result of the above (FIG. 6N).

In this case, as described above, because the gate electrode of the driving transistor $TR_D$ is in a floating state, and the capacitance section $C_1$ is present, a phenomenon similar to so-called bootstrap circuit occurs at the gate electrode of the driving transistor $TR_D$, so that the potential of the first node $ND_1$ also rises. As a result, the potential difference $V_{gs}$ between the gate electrode of the driving transistor $TR_D$ and the other source/drain region acting as the source region of the driving transistor $TR_D$ retains the value of Equation (4).

In addition, because the potential of the second node $ND_2$ rises to exceed ($V_{th\text{-}EL} + V_{Cat}$), the light emitting section ELP starts to emit light (see FIG. 6O). At this time, a current flowing through the light emitting section ELP is the drain current $I_{ds}$ flowing from the drain region to the source region of the driving transistor $TR_D$, and can therefore be expressed by Equation (1). In this case, from Equation (1) and Equation (4), Equation (1) can be modified as in the following Equation (5).

$$I_{ds} = k \cdot \mu \cdot (V_{Sig2\_m} - V_{Ofs} - \Delta V_1 - \Delta V_2)^2 \quad (5)$$

Thus, the drain current $I_{ds}$ flowing through the light emitting section ELP is proportional to the square of a value obtained by subtracting the values of the potential correction values $\Delta V_1$ and $\Delta V_2$ from the value of the second video signal $V_{Sig2\_m}$ when the reference voltage $V_{Ofs}$ is set at 0 volts. In other words, the drain current $I_{ds}$ flowing through the light emitting section ELP does not depend on the threshold voltage $V_{th\text{-}EL}$ of the light emitting section ELP or the threshold voltage $V_{th}$ of the driving transistor $TR_D$. That is, an amount of light emission (luminance) of the light emitting section ELP is not affected by the threshold voltage $V_{th\text{-}EL}$ of the light emitting section ELP or the threshold voltage $V_{th}$ of the driving transistor $TR_D$. The luminance of the display element 10 forming the (n, m)th sub-pixel corresponds to the drain current $I_{ds}$.

The emission state of the light emitting section ELP is continued until an (m+m'−1)th horizontal scanning period. The end timing of the (m+m'−1)th horizontal scanning period corresponds to the end timing of [period-TP(2)$_{-1}$]. In this case, "m'" satisfies a relation 1<m'<M, and is a predetermined value in the display device. In other words, the light emitting section ELP is driven for a period from the start timing of [period-TP(2)$_8$] to timing immediately before the (m+m')th horizontal scanning period $H_{m+m'}$, and this period is an emission period.

The present invention has been described above on the basis of a preferable embodiment. However, the present invention is not limited to this embodiment. The constitution and structure of the display device, the steps of the method for manufacturing the display device, and the steps of the driving methods of the display device and the display element described in the embodiment are an illustration, and can be changed as appropriate.

In the embodiment, the reference voltage is supplied to the data line during the interval after an end of supply of the first video signal to the data line and before a start of supply of the second video signal. However, the present invention is not limited to this. For example, a constitution can be adopted in which the reference voltage continues being supplied to the data line for an interval after the passage of a reference voltage period and before a start of supply of the first video signal, and the second video signal is supplied immediately after an end of supply of the first video signal. In this constitution, the length of the period during which the first writing process is performed can be adjusted by changing the start timing of supply of the first video signal.

The embodiment has been described supposing that the driving transistor $TR_D$ is of an n-channel type. When the driving transistor $TR_D$ is a p-channel type transistor, it suffices to make connections in which the anode electrode and the cathode electrode of the light emitting section ELP are interchanged. Incidentally, in this constitution, the direction in which the drain current $I_{ds}$ flows is changed. It therefore suffices to change the values of voltages supplied to the feeder line PS1 and the like as appropriate.

In addition, the driving circuit 11 forming the display element 10 may further include other transistors. FIG. 13 shows a constitution including a transistor connected to a first node $ND_1$ (first transistor $TR_1$), a second transistor $TR_2$, and a third transistor $TR_3$. Incidentally, there may be constitutions including one or two transistors of the three transistors.

In the first transistor $TR_1$, a reference voltage $V_{Ofs}$ is applied to one source/drain region, and another source/drain region is connected to the first node $ND_1$. A control signal from a first transistor control circuit 103 is applied to the gate electrode of the first transistor $TR_1$ via a first transistor control line AZ1 to control the conducting state/non-conducting state of the first transistor $TR_1$. Thereby, the potential of the first node $ND_1$ can be set.

In the second transistor $TR_2$, an initializing voltage $V_{CC-L}$ is applied to one source/drain region, and another source/drain region is connected to a second node $ND_2$. A control signal from a second transistor control circuit 104 is applied to the gate electrode of the second transistor $TR_2$ via a second transistor control line AZ2 to control the conducting state/non-conducting state of the second transistor $TR_2$. Thereby, the potential of the second node $ND_2$ can be initialized.

The third transistor $TR_3$ is connected between one source/drain region of a driving transistor $TR_D$ and a feeder line PS1. A control signal from a third transistor control circuit 105 is applied to the gate electrode of the third transistor $TR_3$ via a third transistor control line CL.

The present application contains subject matter related to that disclosed in Japanese Priority Patent Application JP 2010-035915 filed in the Japan Patent Office on Feb. 22, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A driving method of a display device, the display device including display elements arranged in a form of a two-dimensional matrix in a first direction and a second direction, the display elements each having a driving circuit and a current driven type light emitting section, the driving circuit including at least a driving transistor having a gate electrode and source/drain regions and a capacitance section, and a current flowing through the light emitting section via the source/drain regions of the driving transistor, the driving method comprising the step of:

in a state of a predetermined driving voltage being applied to one source/drain region of the driving transistor, performing a first writing process of applying a first video signal to the gate electrode of the driving transistor, next performing a second writing process of applying a second video signal to the gate electrode of the driving transistor, and then setting the gate electrode of the driving transistor in a floating state, whereby a current corresponding to a value of a voltage retained in the capacitance section for retaining a voltage of the gate electrode of the driving transistor with respect to a source region of the driving transistor flows through the light emitting section via the driving transistor, so that the light emitting section emits light;

wherein length of a period during which the first video signal is applied to the gate electrode of the driving transistor is adjusted in the first writing process, whereby luminance of light emitted by the light emitting section is controlled on a basis of a value of the first video signal, a value of the length of the period during which the first video signal is applied to the gate electrode of the driving transistor, and a value of the second video signal.

2. The driving method of the display device according to claim 1, wherein one electrode and another electrode forming the capacitance section are connected to the other source/drain region and the gate electrode, respectively, of the driving transistor, and in the first writing process, a current flows through the driving transistor when the first video signal is applied to the gate electrode of the driving transistor, and potential of the other source/drain region of the driving transistor is changed on a basis of the value of the first video signal and the value of the length of the period during which the first video signal is applied to the gate electrode of the driving transistor, whereby the value of the voltage retained in the capacitance section is adjusted.

3. The driving method of the display device according to claim 1, wherein the display device further includes a plurality of scanning lines extending in the first direction and a plurality of data lines extending in the second direction, the driving circuit further includes a writing transistor having a gate electrode connected to a scanning line, one source/drain region connected to a data line, and another source/drain region connected to the gate electrode of the driving transistor, and the writing transistor is set in a conducting state by a scanning signal from the scanning line, the first video signal is applied from the data line to the gate electrode of the driving transistor, next the second video signal is applied from the data line to the gate electrode of the driving transistor, and then the scanning signal is ended to set the writing transistor in a non-conducting state, whereby the gate electrode of the driving transistor is set in a floating state.

4. The driving method of the display device according to claim 1, wherein the display device further includes a plurality of feeder lines extending in the first direction, and one source/drain region of the driving transistor is connected to a feeder line, and the driving voltage is applied from the feeder line to one source/drain region of the driving transistor.

5. The driving method of the display device according to claim 1, wherein before the first writing process, an initializing voltage such that a difference between the initializing voltage and a reference voltage exceeds a threshold voltage of the driving transistor is applied to one source/drain region of the driving transistor, and the reference voltage is applied to the gate electrode of the driving transistor, whereby potential of the gate electrode of the driving transistor and potential of the other source/drain region of the driving transistor are initialized, and next a threshold voltage cancelling process of bringing the potential of the other source/drain region of the driving transistor closer to a potential obtained by subtracting the threshold voltage of the driving transistor from the reference voltage by applying the driving voltage to one source/drain region of the driving transistor in a state of the reference voltage being applied to the gate electrode of the driving transistor is performed.

6. The driving method of the display device according to claim 5, wherein the display device further includes a plurality of feeder lines extending in the first direction, and one source/drain region of the driving transistor is connected to a feeder line, and the driving voltage and the initializing voltage are applied from the feeder line to one source/drain region of the driving transistor.

7. The driving method of the display device according to claim 5, wherein the display device further includes a plurality of scanning lines extending in the first direction and a plurality of data lines extending in the second direction, the driving circuit further includes a writing transistor having a gate electrode connected to a scanning line, one source/drain region connected to a data line, and another source/drain region connected to the gate electrode of the driving transistor, and the writing transistor is set in a conducting state by a scanning signal from the scanning line, and the first video signal, the second video signal, and the reference voltage are applied from the data line to the gate electrode of the driving transistor.

8. The driving method of the display device according to claim 7, wherein the display device further includes a plurality of feeder lines extending in the first direction, and one source/drain region of the driving transistor is connected to a feeder line, and the driving voltage and the initializing voltage are applied from the feeder line to one source/drain region of the driving transistor.

9. A display device comprising:

a signal output circuit, a scanning circuit, and a power supply section; and display elements arranged in a form of a two-dimensional matrix in a first direction and a second direction and each having a driving circuit and a current driven type light emitting section;

the driving circuit including at least a driving transistor having a date electrode and source/drain regions and a capacitance section, and a current flowing through the light emitting section via the source/drain regions of the driving transistor;

wherein in a state of a predetermined driving voltage being applied to one source/drain region of the driving transistor on a basis of operation of the power supply section, a first writing process is performed by applying a first video signal to the gate electrode of the driving transistor on a basis of operation of the signal output circuit, next a second writing process is performed by applying a second video signal to the gate electrode of the driving transistor on a basis of operation of the signal output circuit, and then the gate electrode of the driving transistor is set in a floating state on a basis of operation of the scanning circuit, whereby a current corresponding to a value of a voltage retained in the capacitance section for retaining a voltage of the gate electrode of the driving transistor with respect to a source region of the driving transistor flows through the light emitting section via the driving transistor, so that the light emitting section emits light, and length of a period during which the first video signal is applied to the gate electrode of the driving transistor is adjusted in the first writing process, and luminance of light emitted by the light emitting section is controlled on a basis of a value of the first video signal, a value of the length of the period during which the first video signal is applied to the gate electrode of the driving transistor, and a value of the second video signal.

10. A driving method of a display element, the display element having a driving circuit and a current driven type light emitting section, the driving circuit including at least a driving transistor having a gate electrode and source/drain regions and a capacitance section, and a current flowing through the light emitting section via the source/drain regions of the driving transistor, the driving method comprising the step of:

in a state of a predetermined driving voltage being applied to one source/drain region of the driving transistor, performing a first writing process of applying a first video signal to the gate electrode of the driving transistor, next performing a second writing process of applying a second video signal to the gate electrode of the driving transistor, and then setting the gate electrode of the driving transistor in a floating state, whereby a current corresponding to a value of a voltage retained in the capacitance section for retaining a voltage of the gate electrode of the driving transistor with respect to a source region of the driving transistor flows through the light emitting section via the driving transistor, so that the light emitting section emits light;

wherein length of a period during which the first video signal is applied to the gate electrode of the driving transistor is adjusted in the first writing process, whereby luminance of light emitted by the light emitting section is controlled on a basis of a value of the first video signal, a value of the length of the period during which the first video signal is applied to the gate electrode of the driving transistor, and a value of the second video signal.

11. A driving method of a display device, the driving method comprising the step of:

performing a first writing process of applying a first video signal to a gate electrode of a driving transistor, next performing a second writing process of applying a second video signal to the gate electrode of the driving transistor, and then passing a current through a light emitting section via the driving transistor, so that the light emitting section emits light;

wherein a value of the first video signal, a value of length of a period during which the first video signal is applied to the gate electrode of the driving transistor, and a value of the second video signal are controlled.

* * * * *